US010282695B1

(12) United States Patent
McNamara et al.

(10) Patent No.: US 10,282,695 B1
(45) Date of Patent: May 7, 2019

(54) COLOR ADAPTABLE INVENTORY MANAGEMENT USER INTERFACE

(71) Applicant: AMAZON TECHNOLOGIES, INC., Reno, NV (US)

(72) Inventors: Alexander Michael McNamara, Seattle, WA (US); Korwin Jon Smith, Seattle, WA (US); Benjamin Ralph Hollis, Seattle, WA (US); Sridhar Boyapati, Sammamish, WA (US); Jared Joseph Frank, Snoqualmie, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 903 days.

(21) Appl. No.: 14/222,502

(22) Filed: Mar. 21, 2014

(51) Int. Cl.
*G06Q 10/08* (2012.01)
*G06F 3/048* (2013.01)

(52) U.S. Cl.
CPC ........... *G06Q 10/087* (2013.01); *G06F 3/048* (2013.01)

(58) Field of Classification Search
CPC .................................................. G06Q 10/087
USPC .......................................................... 705/28
See application file for complete search history.

(56) References Cited

U.S. PATENT DOCUMENTS

| 5,859,644 | A | * | 1/1999 | Stokes | G06F 3/04897 345/601 |
|---|---|---|---|---|---|
| 7,225,980 | B2 | | 6/2007 | Ku et al. | |
| 7,831,654 | B1 | | 11/2010 | Magsamen, Jr. et al. | |
| 7,949,568 | B2 | | 5/2011 | Fano et al. | |
| 8,009,864 | B2 | | 8/2011 | Linaker et al. | |
| 8,139,751 | B1 | | 3/2012 | Magsamen, Jr. et al. | |
| 8,175,925 | B1 | | 5/2012 | Rouaix | |
| 8,189,855 | B2 | | 5/2012 | Opalach et al. | |
| 8,386,340 | B1 | | 2/2013 | Feinstein | |
| 8,630,924 | B2 | | 1/2014 | Groenevelt et al. | |
| 8,669,998 | B1 | * | 3/2014 | McBride | H04N 1/387 345/591 |
| 9,235,928 | B2 | | 1/2016 | Medioni et al. | |
| 2002/0109008 | A1 | * | 8/2002 | Shoda | G06Q 10/08 235/375 |

(Continued)

FOREIGN PATENT DOCUMENTS

CN         103529939 A    *   1/2014

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013], Retrieved from the Internet: <URL:http://citeseerx.ist.psu.edu/viewdoc/summary?doi=10.1.1.127.3033>.

(Continued)

*Primary Examiner* — Scott A Zare
(74) *Attorney, Agent, or Firm* — Lindauer Law, PLLC

(57) ABSTRACT

Described are systems and techniques configured to determine and present information to a user of a materials handling facility. As the user moves through the facility, information is dynamically presented to the user on one or more displays using a user interface. The user interface may be presented on the display as the user approaches, and presentation may cease as the user moves away. The amount of information, size of elements presented on the display, and so forth may be based on kinematic data about the user. The kinematic data may include position, speed, orientation, and so forth.

20 Claims, 15 Drawing Sheets

(56) References Cited

U.S. PATENT DOCUMENTS

| | | | |
|---|---|---|---|
| 2004/0267592 | A1 | 12/2004 | Ogushi et al. |
| 2008/0079750 | A1* | 4/2008 | Setlur .................. G06F 3/14 345/593 |
| 2010/0241277 | A1* | 9/2010 | Humphrey .......... G01F 23/0076 700/282 |
| 2011/0011936 | A1 | 1/2011 | Morandi et al. |
| 2011/0252344 | A1* | 10/2011 | van Os ................ G06F 9/4443 715/763 |
| 2011/0302630 | A1* | 12/2011 | Nair ...................... G06F 21/41 726/4 |
| 2012/0096403 | A1 | 4/2012 | Jung et al. |
| 2012/0144334 | A1* | 6/2012 | Reichert .............. G06Q 10/087 715/771 |
| 2012/0284132 | A1 | 11/2012 | Kim et al. |
| 2013/0284806 | A1 | 10/2013 | Margalit |
| 2015/0086107 | A1 | 3/2015 | Dedeoglu et al. |

OTHER PUBLICATIONS

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011, Retrieved from Internet: <URL:http://www.researchgate.net/publication/221568350_How_to_nudge_in_Situ_designing_lambent_devices_to_deliver_salient_information_in_supermarkets>.

Pop, Christian, "Introduction to the BodyCom Technology", AN1391, DS01391A, Microchip Technology, Inc., May 2, 2011.

Logan, Kyle O., "Non-Final Office Action dated Dec. 21, 2015", U.S. Appl. No. 14/222,492, The United States Patent and Trademark Office, Dec. 21, 2015.

Logan, Kyle O., "Notice of Allowance dated Apr. 7, 2017", U.S. Appl. No. 14/222,492, The United States Patent and Trademark Office, Apr. 7, 2017.

"Extracting the Dominant Color From an Image in Processing", Accidentally in Code Engineering an Interesting Life (A blog), [online], [retrieved Feb. 12, 2014]. Retrieved from the Internet: <URL: http://www.catehuston.com/blog/2013/08/26/extracting-the-dominant-color-from-an-image-in-processing/>.

"Using python and k-means to find the dominant colors in images", [online], Oct. 23, 2012, 17:23 [retrieved Feb. 12, 2014]. Retrieved from the Internet: <URL: http://charlesleifer.com/blog/using-python-and-k-means-to-find-the-dominant-colors-in-images/>.

"benhowdle89 /Adaptive-Backgrounds", [online], [retrieved on Feb. 12, 2014]. Retrieved from the Internet: <URL: https://github.com/benhowdle89/Adaptive-Backgrounds>.

"lokesh / color-thief", [online], [retrieved on Feb. 12, 2014]. Retrieved from the Internet: <URL: https://github.com/lokesh/color-thief/blob/master/js/color-thief.js>.

"ColorFinder: Find the most prominent color in an image", [online], [retrived on Feb. 12, 2014]. Retrieved from the Internet: <URL: http://pieroxy.net/blog/pages/color-finder/index.html>.

* cited by examiner

COLOR ADAPTABLE INVENTORY MANAGEMENT USER INTERFACE

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area) and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. In each instance, for an item to be moved from one location to another, it is picked from its current location and transitioned to a new location. It is often desirable to provide to users information associated with the items in inventory or other information about operation of the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
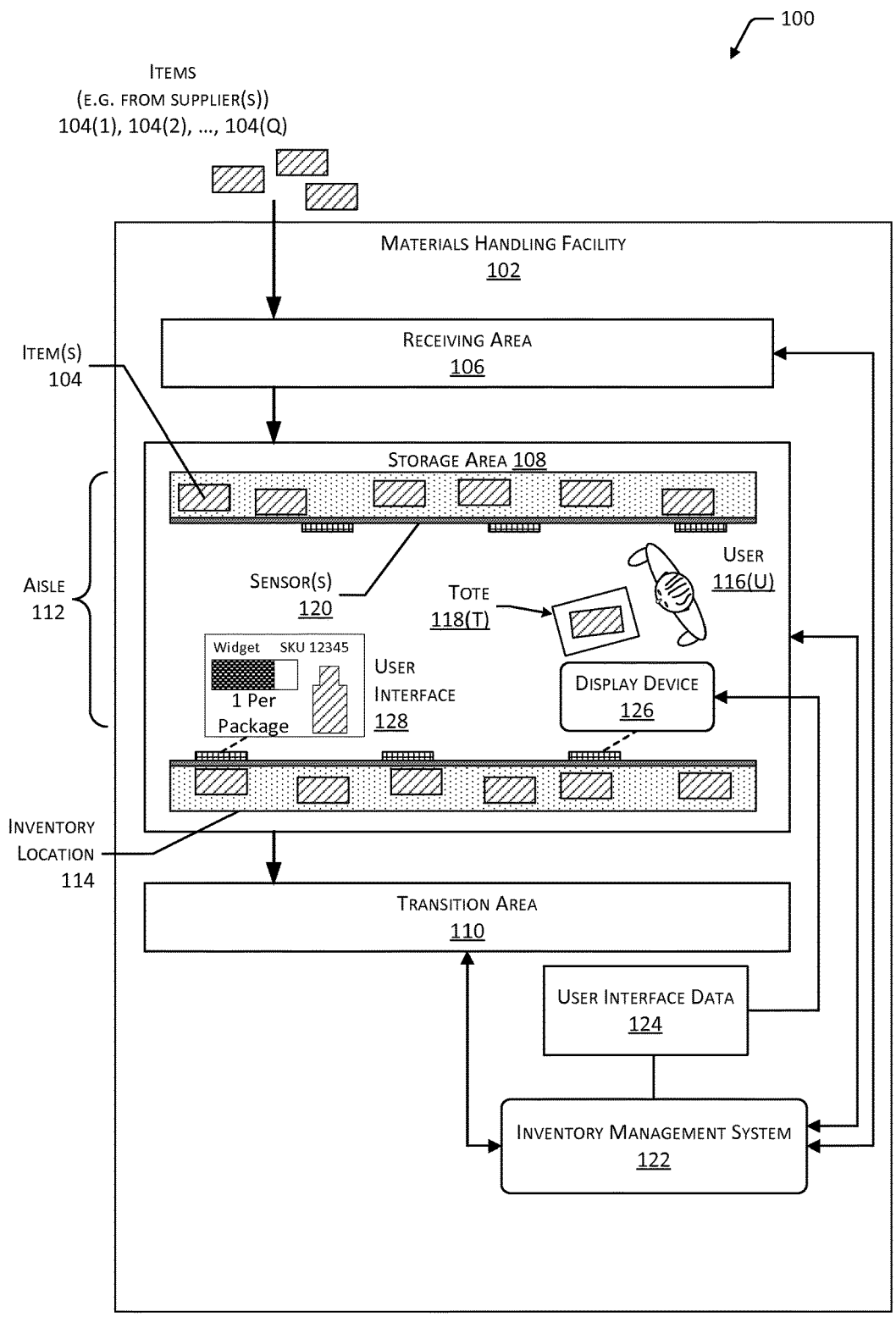
FIG. 1 is a block diagram illustrating a materials handling facility (facility) configured to provide a display of information at one or more inventory locations, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for providing information to a user of a materials handling facility (facility). The facility may include, or have access to, an inventory management system. The inventory management system may be configured to maintain information about items within the facility. For example, the inventory management system may maintain information indicative of quantities of items at various inventory locations, movement of items, and so forth.

The inventory management system provides information associated with operation of the facility to the user of the facility. For example, the inventory management system may present information about items to the user using a display device.

Traditional mechanisms for providing information may result in information overload or a condition in which the user is inattentive to, or ignores, the information. For example, an aisle in a traditional facility may contain hundreds of tags, each with various pieces of information such as stock keeping unit (SKU), name, description, and so forth. Continuing the example, the user may become fatigued or delayed by looking through all of this information while trying to find the tag for a particular item. As a result, the user may be confused in determining which tag is associated with which inventory location. Furthermore, electronic displays used to present the information of the tags may consume power during operation.

The systems and techniques described in this disclosure may be used to present information to the user in a user interface which changes dynamically. The user interface is displayed on a display device and may be associated with particular inventory locations. For example, the inventory location may comprise a shelf having a display device mounted on a front of the shelf, facing towards the user. The user interface may be presented on the display device, providing information to the user.

The user interface is dynamic in that one or more of: what information is presented, when the information is presented, how the information is presented, or other aspects, may vary based at least in part on kinematic data. The kinematic data may include information about the position, distance to a particular point, movement, speed, gaze direction, acceleration, and so forth, of an object such as a user or a tote.

The kinematic data about the user or another object, such as a tote, may be generated from sensor input. For example, imaging sensors such as cameras may acquire images of the user in the facility. Continuing the example, the inventory management system may use this information to determine kinematic data indicating the distance between the user and the inventory location is 3.1 meters.

In one implementation, the user interface may be dynamically adjusted based on distance. For example, as a user approaches an inventory location, the display may present an item name of the item associated with that inventory location. As the user continues to approach and the distance decreases, more information may be presented in the user interface.

In another implementation, the user interface may be dynamically adjusted based on speed. For example, the user interface may present an item name to a rapidly moving user, while a slow moving user sees the user interface presenting detailed information about the item.

The dynamic behavior of the user interface may be based on combinations of kinematic data. For example, the information may be based on the distance, speed, and orientation of the user.

The user interface may also include one or more visual elements which present a color based at least in part on a representative color of the inventory location. By presenting the representative color or using a color palette which is based on the representative color, the user interface shares a common visible element with the inventory location. This common visible element may improve the ability of the user to associate a particular user interface with a particular inventory location. For example, the representative color of an inventory location containing green boxes would be green. The user interface may include a border or background which is also green. Continuing the example, the user sees the green in the user interface as presented on the display and the green on the shelf and is thus able to determine the user interface contains information about the green items in the inventory location.

The representative color may be determined by acquiring an image of the inventory location and analyzing at least some of the pixels of the image. For example, the image may be processed to determine colors with the greatest frequency of occurrence, which may be designated as the representative color.

The image acquisition and the determination of the representative color may be performed at particular intervals or upon a change in the image. For example, as the user reaches a hand towards the inventory location to pick up an item stored therein, the representative color may change based on the color of the user's hand and sleeve. In another example, as stock is depleted from the inventory location leaving an empty shelf, the representative color may also change, with a corresponding change in the color of the visual element of the user interface.

The user interfaces described in this disclosure may convey several benefits. Operational costs of the facility may be reduced by improving picking speed, improving picking accuracy, reducing power consumption, and so forth.

Picking speed may be improved by decluttering the information presented to the user by presenting limited information such as only a SKU and item name at a relatively large font size, allowing the user to quickly find that item in a visual scan of many inventory locations. Additionally, the accuracy of picking the correct item may be improved by providing additional details to the user as they approach the inventory location, providing information such as packing details, package quantities, and so forth, at the time needed. By focusing presentation of information to the time and place needed, the level of cognitive engagement called for by the user to perform their task may be reduced.

Power consumption and corresponding facilities costs such as cooling and maintenance may be reduced by selectively deactivating the displays when not in use. For example, the kinematic data may be used to determine a particular display or group of displays may be seen. Continuing this example, the displays in the facility having a single user may be active in a portion of an aisle occupied by the user and along a direction the user is facing and inactive elsewhere. Additionally, by deactivating the displays or other devices when not in use, the operational lifespan of these devices may be increased.

The facility may include a material handling facility, library, museum, and so forth. As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

The systems and techniques described herein allow for information to be presented in a dynamic user interface in a way which is meaningful, unobtrusive, and responsive to the user. The user interface may result in increased accuracy of the inventory management system, improved experience by the user, and so forth.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms. The inventory locations 114 may be affixed to the floor or another portion of the facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one position within the facility 102 to another.

One or more users 116(1), 116(2), . . . , 116(U) and totes 118(1), 118(2), . . . , 118(T) or other material handling apparatus may move within the facility 102. For example, the user 116 may move about within the facility 102 to pick or place the items 104 in various inventory locations 114, placing them on the tote 118 for ease of transport. In other implementations, other agencies such as robots, forklifts, cranes, aerial drones, and so forth, may move about the facility 102 picking, placing, or otherwise moving the items 104.

One or more sensors 120 may be configured to acquire information in the facility 102. The sensors 120 may include, but are not limited to, weight sensors, vibration sensors, radio frequency (RF) receivers, imaging sensors, temperature sensors, humidity sensors, and so forth. The sensors 120 may be stationary or mobile, relative to the facility 102. For example, the inventory locations 114 may contain cameras configured to acquire images of pick or placement of items 104 on shelves. In another example, the floor of the facility 102 may include weight sensors configured to determine a weight of the user 116 or other object thereupon. The sensors 120 are discussed in more detail below with regard to FIG. 2.

During operation of the facility 102, the sensors 120 may be configured to provide information suitable for tracking how objects move within the facility 102. For example, a series of images acquired by a camera may indicate removal of an item 104 from a particular inventory location 114 by the user 116 and placement of the item 104 on or at least partially within the tote 118. The sensors 120 are discussed in more detail below with regard to FIG. 2. The tote 118 is discussed in more detail below with regard to FIG. 4.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. For example, in some implementations, multiple different receiving areas 106, storage areas 108, and transition areas 110 may be interspersed rather than segregated.

The facility 102 may include, or be coupled to, an inventory management system 122. The inventory management system 122 is configured to interact with users or devices such as sensors, robots, material handling equipment, computing devices, and so forth, in one or more of the receiving area 106, the storage area 108, or the transition area 110.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item, depending on the nature of the enterprise that operates the facility 102.

Upon being received from a supplier at receiving area 106, the items 104 may be prepared for storage. For example, in some implementations, items 104 may be unpacked, or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another, or from one entity to another. For example, the transition area 110 may be a packing station within the facility 102. When the item 104 arrives at the transition area 110, the items 104 may be transitioned from the storage area 108 to the packing station. Information about the transition may be maintained by the inventory management system 122.

In another example, if the items 104 are departing the facility 102 a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

During use of the facility 102, the user 116 may move about the facility 102 to perform various tasks, such as picking or placing the items 104 in the inventory locations 114. The user 116 may benefit from presentation of information about the items 104, such as a SKU, item name, description, packaging information, and so forth.

The inventory management system 122 is configured to generate user interface data 124. The user interface data 124 may comprise commands, instructions, tags, markup language, images, color values, text, or other data. For example, the user interface data 124 may be expressed as HyperText Markup Language (HTML), Cascading Style Sheets (CSS), JavaScript, and so forth. One or more computing devices with one or more displays, such as display devices 126, are configured to use the user interface data 124 to render and present a user interface 128 which may be perceived by the user 116. For example, the rendering may comprise processing by a web rendering engine such as WebKit as promulgated by Apple Inc., Chromium as promulgated by Google Inc., Trident as promulgated by Microsoft Corporation, and so forth. The user interface 128 may include one or more elements including visual, haptic, audible, olfactory, and so forth. The display devices 126 are discussed in more detail below with regard to FIG. 2.

The inventory management system 122 may determine or access data such as kinematic data about objects in the facility 102, image data, or other information acquired by one or more of the sensors 120. The objects may include the items 104, the inventory locations 114, the users 116, the totes 118, and so forth.

The kinematic data may include information about the position, distance to a particular point, movement, speed, gaze direction, acceleration, and so forth, of the object. For example, the kinematic data may include a distance between the user 116 and a particular inventory location 114 at a particular moment in time. In another example, the kinematic data may include a speed of the tote 118 at a particular moment in time. The kinematic data is described in more detail below with regard to FIG. 3 and FIG. 6.

The image data may comprise one or more images of at least a portion of an inventory location 114. For example, a camera with a field-of-view directed at a shelf holding an item 104 may acquire the images. The image data is described in more detail below with regard to FIG. 3.

The inventory management system 122 generates the user interface data 124 based on one or more of the kinematic data, the image data, and so forth. For example, the user interface data 124 may comprise HTML, CSS, and information indicating a particular display device 126 associated with a particular inventory location 114. The resulting user interface 128 presented by the display device 126 may present a representative color found in the image of the inventory location, with animated presentation of information. The presentation may be such that, as the user 116 approaches the inventory location 114, additional information appears in the user interface 128, size and layout of visual elements in the user interface 128 changes, and so forth.

In some implementations, the changes to the user interface 128 may be responsive to inputs which change over time, or may be based on predicted data. For example, on-going kinematic data may be acquired using the one or more sensors 120 which may be used to update the user interface 128 in real-time or near-real-time based on the movement of the object. In another example, predicted kinematic data may comprise one or more predicted motion vectors estimating or anticipating the motion of the object without subsequent updates from the sensors 120 as time progresses.

Other data which may be determined or accessed by the inventory management system 122 includes a height of the user. For example, based on the data from the sensors 120 or information in a database, the height of the user 116 may be determined to be 2.1 meters. Based on this information, the user interface 128 may be adjusted such that information is presented on portions of a display device 126 which are visible to the user 116 during use of the facility 102. For example, the display device 126 may comprise a flexible organic light emitting diode (OLED) display which wraps around a front edge of the shelves which make up the inventory locations 114. Based on the height of the user 116, an upper section, front section, or lower section of the display device 126 may be used to present information to the user 116. This scenario is discussed in more detail below with regard to FIG. 5.

The inventory management system 122 may thus be configured to determine what information is presented, when the information is presented, how the information is presented, or other aspects of the user interface 128 responsive to the kinematic data, image data, or other inputs. The resulting user interface 128 is dynamic and may improve the experience of the user 116. The user interfaces 128 are discussed below with regard to FIGS. 7-15.

Figure 2:
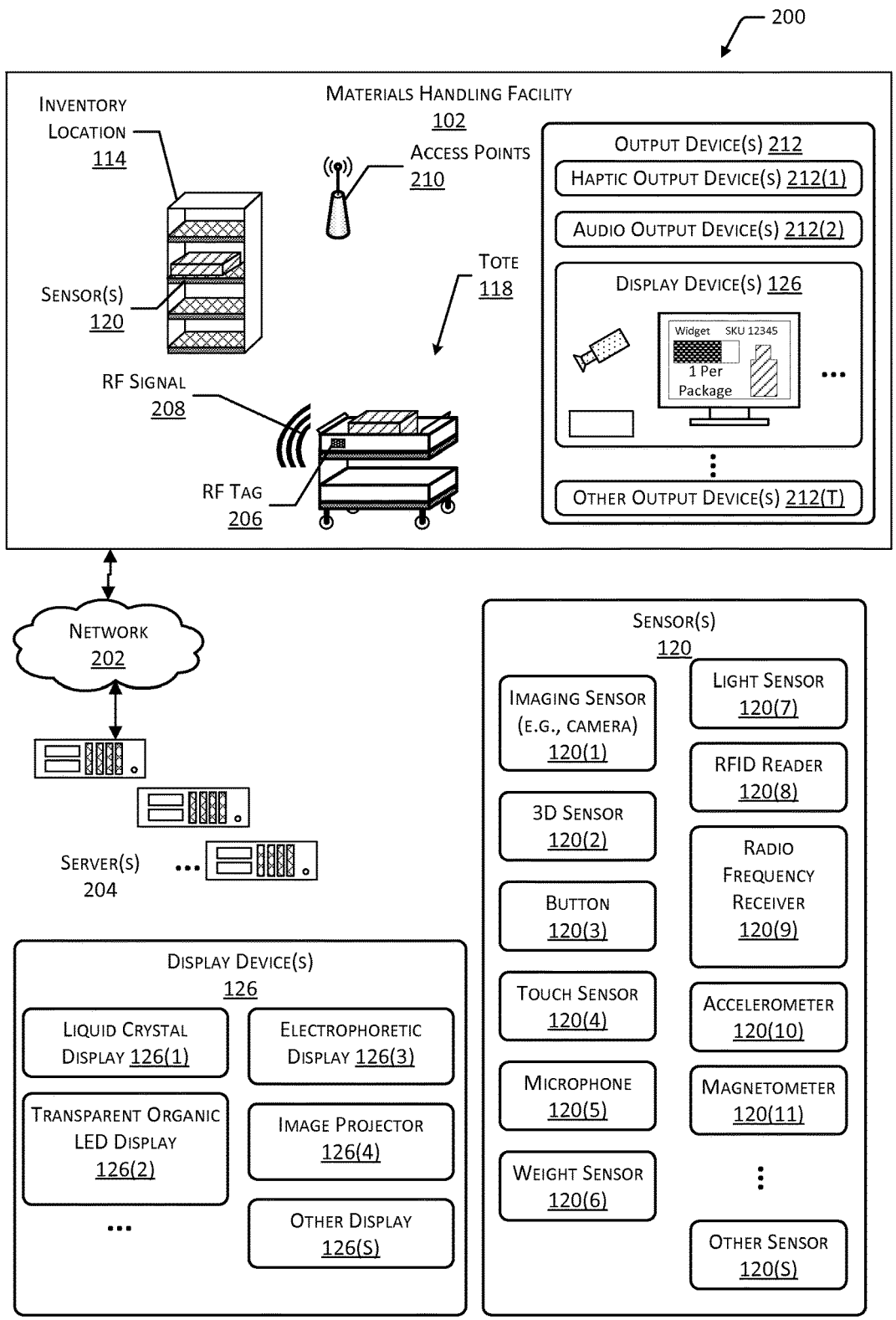
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite), or other connection technologies.

The servers 204 may be configured to execute one or more modules or software applications associated with the inventory management system 122. While the servers 204 are illustrated as being in a location outside of the facility 102, in other implementations, at least a portion of the servers 204 may be located at the facility 102. The servers 204 are discussed in more detail below with regard to FIG. 3.

The totes 118 or other objects in the facility 102 may be equipped with one or more radio frequency (RF) tags 206. The RF tags 206 are configured to emit an RF signal 208. In one implementation, the RF tag 206 may be a radio frequency identification (RFID) tag configured to emit the RF signal 208 upon activation by an external signal. For example, the external signal may comprise a radio frequency signal or a magnetic field configured to energize or activate the RFID tag. In another implementation, the RF tag 206 may comprise a transmitter and a power source configured to power the transmitter. For example, the RF tag 206 may comprise a Bluetooth Low Energy (BLE) transmitter and battery. In other implementations, the tag may use other techniques to indicate presence. For example, an acoustic tag may be configured to generate an ultrasonic signal which is detected by corresponding acoustic receivers. In yet another implementation, the tag may be configured to emit an optical signal.

The inventory management system 122 may be configured to use the RF tags 206 for one or more of identification of the object, determining a position of the object, and so forth. For example, the users 116 may wear RF tags 206, the totes 118 may have RF tags 206 affixed, and so forth. The tote 118 is configured to carry or otherwise transport one or more items 104. For example, the tote 118 may include a basket, a cart, a bag, and so forth. The tote 118 is discussed in more detail below with regard to FIG. 4.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, or ceiling, at an inventory location 114, on the tote 118, may be carried or worn by the user 116, and so forth.

The sensors 120 may include one or more imaging sensors 120(1). These imaging sensors 120(1) may include cameras configured to acquire images of a scene. The imaging sensors 120(1) are configured to detect light in one or more wavelengths including, but not limited to, terahertz, infrared, visible, ultraviolet, and so forth. The inventory management system 122 may use image data acquired by the imaging sensors 120(1) during operation of the facility 102. For example, the inventory management system 122 may identify items 104, users 116, totes 118, and so forth, based at least in part on their appearance within the image data.

One or more 3D sensors 120(2) may also be included in the sensors 120. The 3D sensors 120(2) are configured to acquire spatial or three-dimensional data, such as depth information, about objects within a sensor field-of-view. The 3D sensors 120(2) include range cameras, lidar systems, sonar systems, radar systems, structured light systems, stereo vision systems, optical interferometry systems, and so forth. The inventory management system 122 may use the three-dimensional data acquired to identify objects, determine a position of an object, and so forth. For example, the inventory management system 122 may determine kinematic data such as position in the facility 102 of the user 116 based at least in part on the position in three-dimensional space of the user 116.

One or more buttons 120(3) are configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the tote 118 may be configured with a button 120(3) in a handle such that the button 120(3) is activated while the user 116 is holding the handle. The inventory management system 122 may use this information to ensure that the user 116 is proximate to the tote 118, and adjust the user interface 128 based on this proximity.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The position of that change in electrical resistance within the material may indicate the position of the touch. The inventory management system 122 may use data from the touch sensors 120(4) to receive information from the user 116. For example, the touch sensor 120(4) may be integrated with a display device 126 to provide a touchscreen with which the user 116 may select from a menu one or more particular items 104 for picking.

One or more microphones 120(5) may be configured to acquire information indicative of sound present in the environment. In some implementations, arrays of microphones 120(5) may be used. These arrays may implement beamforming techniques to provide for directionality of gain. The inventory management system 122 may use the one or more microphones 120(5) to acquire information from acoustic tags, accept voice input from the users 116, determine the position of one or more users 116 in the facility 102, determine ambient noise level, and so forth. For example, the inventory management system 122 may determine the ambient noise level proximate to the user 116 is high, based on input from the microphones 120(5). Based on this determination, the inventory management system 122 may increase the font size of the text information presented by the user interface 128, or increase a volume of audible user interface output.

One or more weight sensors 120(6) are configured to measure the weight of a load, such as the item 104, the user 116, the tote 118, and so forth. The weight sensors 120(6) may be configured to measure the weights of the load at one or more of the inventory locations 114, the tote 118, or on the floor of the facility 102. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers which generate one or more signals based on an applied force, such as that of the load due to gravity. The inventory management system 122 may use the data acquired by the weight sensors 120(6) to identify an object, determining a location of an object, maintain shipping records, and so forth.

The sensors 120 may include one or more light sensors 120(7). The light sensors 120(7) may be configured to provide information associated with ambient lighting conditions such as a level of illumination. Information acquired by the light sensors 120(7) may be used by the inventory management system 122 to adjust a level or intensity of the notification output. For example, light sensor 120(7) may indicate that a portion of the facility 102 is brightly lit by direct sunlight, and the intensity of illumination provided by the display devices 126 during presentation of the notification output may be increased to maintain visibility under these brightly lit conditions.

One more radio frequency identification (RFID) readers 120(8), near field communication (NFC) systems, and so forth, may also be provided in the sensors 120. For example, the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth. For example, based on information from the RFID readers 120(8), a velocity of the RF tag 206 may be determined and used as kinematic data.

One or more RF receivers 120(9) may also be provided. In some implementations, the RF receivers 120(9) may be part of transceiver assemblies. The RF receivers 120(9) may be configured to acquire RF signals 208 associated with Wi-Fi, Bluetooth, ZigBee, 3G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF tag 206.

The sensors 120 may include one or more accelerometers 120(10), which may be worn or carried by the user 116, mounted to the tote 118, and so forth. The accelerometers 120(10) may provide information such as the direction and magnitude of an imposed acceleration. Kinematic data such as rate of acceleration, determination of changes in direction, speed, and so forth, may be determined using the accelerometers 120(10).

A magnetometer 120(11) may be used to determine a heading by measuring ambient magnetic fields, such as the terrestrial magnetic field. The magnetometer 120(11) may be worn or carried by the user 116, mounted to the tote 118, and so forth. For example, the magnetometer 120(11) worn by the user 116 may act as a compass and provide information indicative of which way the user 116 is facing.

The sensors 120 may include other sensors 120(S) as well. For example, the other sensors 120(S) may include proximity sensors, ultrasonic rangefinders, optical rangefinders, thermometers, barometric sensors, hygrometers, or biometric input devices including, but not limited to, fingerprint readers or palm scanners. For example, the inventory management system 122 may use information acquired from thermometers and hygrometers in the facility 102 to modify the user interface 128 to direct the user 116 to pick particular items 104 from a first inventory location 114(1) in preference to a second inventory location 114(2).

The facility 102 may include one or more access points 210 configured to establish one or more wireless networks. The access points 210 may use Wi-Fi, near field communication (NFC), Bluetooth, or other technologies to establish wireless communications between a device and the network 202. The wireless networks allow the devices to communicate with one or more of the inventory management system 122, the sensors 120, the display devices 126, the RF tag 206, a communication device of the tote 118, or other devices.

Output devices 212 may also be provided in the facility 102. The output devices 212 are configured to generate signals which may be used to provide information to the user 116. The inventory management system 122 may generate the user interface data 124, which is then used by the output devices 212 to generate the user interface 128. The user interface 128 may be configured to stimulate one or more senses of the user 116. For example, the user interface 128 may comprise visual, audible, and haptic output.

Haptic output devices 212(1) are configured to provide a signal which results in a tactile sensation to the user 116. The haptic output devices 212(1) may use one or more mechanisms such as electrical stimulation or mechanical displacement to provide the signal. For example, the haptic output devices 212(1) may be configured to generate a modulated electrical signal which produces an apparent tactile sensation in one or more fingers of the user 116. In another example, the haptic output devices 212(1) may comprise piezoelectric or rotary motor devices configured to provide a vibration which may be felt by the user 116.

One or more audio output devices 212(2) are configured to provide acoustic output. The acoustic output includes one or more of infrasonic sound, audible sound, or ultrasonic sound. The audio output devices 212(2) may use one or more mechanisms to generate the sound. These mechanisms may include, but are not limited to: voice coils, piezoelectric elements, magnetorestrictive elements, or electrostatic elements, and so forth. For example, a piezoelectric buzzer or a speaker may be used to provide acoustic output.

The display devices 126 may be configured to provide output which may be seen by the user 116, or detected by a light-sensitive detector such as an imaging sensor 120(1) or light sensor 120(7). The output may be monochrome or color. The display devices 126 may be emissive, reflective, or both. An emissive display device 126 is configured to emit light during operation. For example, a light emitting diode (LED) is an emissive visual display device 126. In comparison, a reflective display device 126 relies on ambient light to present an image. For example, an electrophoretic display is a reflective display device 126. Backlights or front lights may be used to illuminate the reflective visual display device 126 to provide visibility of the information in conditions where the ambient light levels are low.

Mechanisms of the display devices 126 may include liquid crystal displays 126(1), transparent Organic Light Emitting Diodes (OLED) displays 126(2), electrophoretic displays 126(3), image projectors 126(4), or other display mechanisms 126(S). The other displays 126(S) may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display devices 126 may be configured to present images. For example, the display devices 126 may comprise a pixel-addressable display. The image may comprise at least a two-dimensional array of pixels, or a vector representation of an at least two-dimensional image.

In some implementations, the display devices 126 may be configured to provide non-image data, such as text characters, colors, and so forth. For example, a segmented electrophoretic display, segmented LED, and so forth, may be used to present information such as a SKU number. The display devices 126 may also be configurable to vary the color of the text, such as using multicolor LED segments.

In some implementations, display devices 126 may be configurable to provide image or non-image output. For example, an electrophoretic display 126(3) with addressable pixels may be used to present images of text information, or all of the pixels may be set to a solid color to provide a colored panel.

The display devices 126 may include hardware processors, memory, and other elements configured to accept and process the user interface data 124 to present the user interface 128. For example, the display devices 126 may comprise one or more display mechanisms such as a transparent OLED display 126(2) driven by a computing device.

Other output devices 212(T) may also be present. For example, the other output devices 212(T) may include scent/odor dispensers, document printers, three-dimensional printers or fabrication equipment, and so forth.

Figure 3:
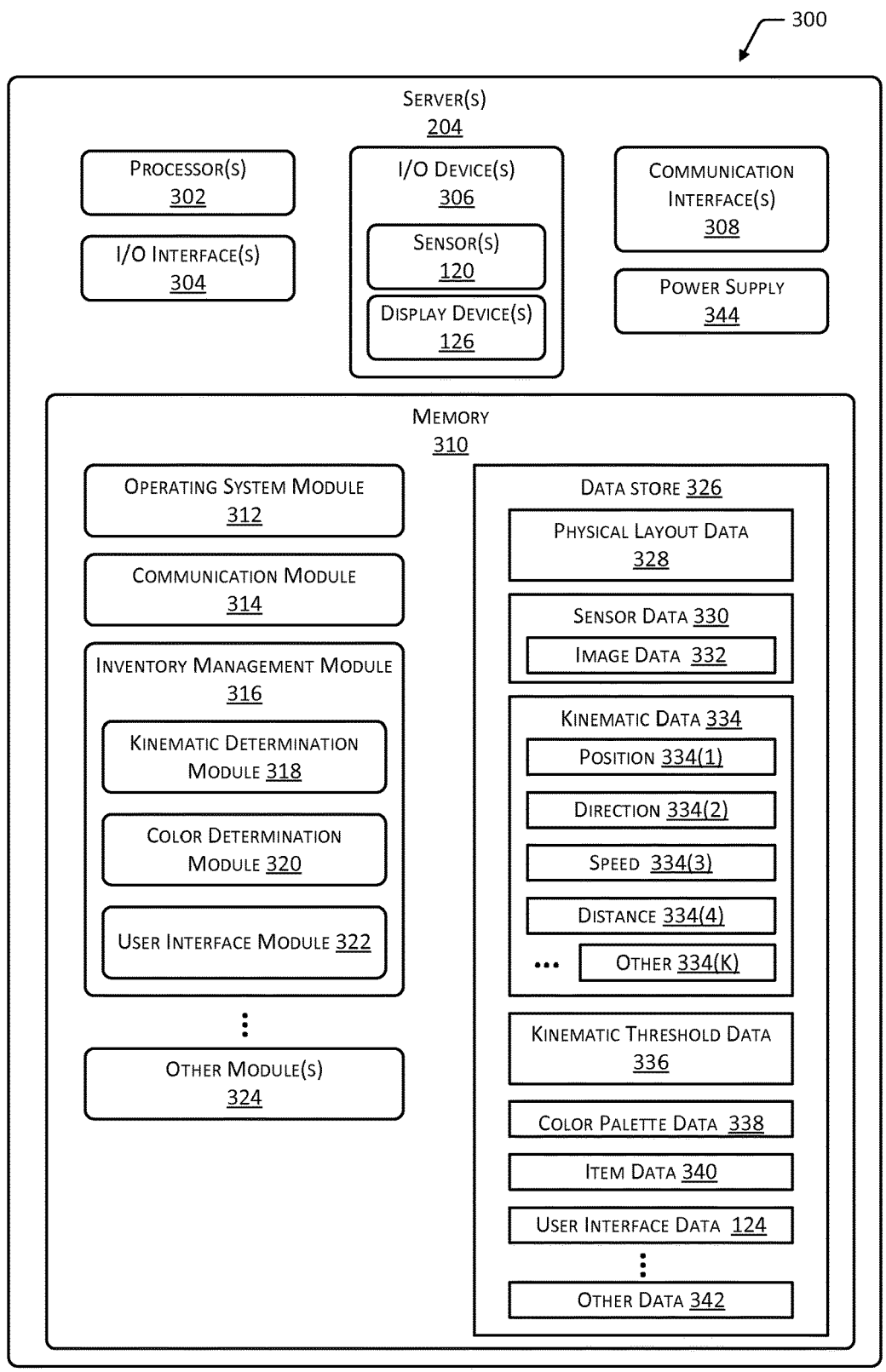
FIG. 3 illustrates a block diagram of a server configured to support operation of the facility, according to some implementations.

FIG. 3 illustrates a block diagram 300 of the server 204. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing," "software as a service (SaaS)," "platform computing," "network-accessible platform," "cloud services," "data centers," and so forth. Services provided by the server 204 may be distributed across one or more physical or virtual devices.

The server 204 may include one or more hardware processors 302 (processors) configured to execute one or more stored instructions. The processors 302 may comprise one or more cores. The server 204 may include one or more input/output (I/O) interface(s) 304 to allow the processor 302 or other portions of the server 204 to communicate with other devices. The I/O interfaces 304 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 304 may couple to one or more I/O devices 306. The I/O devices 306 may include input devices such as one or more of a keyboard, mouse, scanner, and so forth. The I/O devices 306 may also include output devices such as one or more of a display, printer, audio speakers, and so forth. In some embodiments, the I/O devices 306 may be physically incorporated with the server 204 or may be externally placed.

The server 204 may also include one or more communication interfaces 308. The communication interfaces 308 are configured to provide communications between the server 204 and other devices, such as the sensors 120, routers, access points 210, and so forth. The communication interfaces 308 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi, and so forth.

The server 204 may also include one or more busses or other internal communications hardware or software that allow for the transfer of data between the various modules and components of the server 204.

As shown in FIG. 3, the server 204 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the server 204. A few example functional modules are shown stored in the memory 310, although the same functionality may alternatively be implemented in hardware, firmware, or as a system on a chip (SOC).

The memory 310 may include at least one operating system (OS) module 312. The OS module 312 is configured to manage hardware resource devices such as the I/O interfaces 304, the I/O devices 306, the communication interfaces 308, and provide various services to applications or modules executing on the processors 302. The OS module 312 may implement a variant of the FreeBSD operating system as promulgated by the FreeBSD Project, other UNIX or UNIX-like variants, a variation of the Linux operating system as promulgated by Linus Torvalds, the Windows Server operating system from Microsoft Corporation of Redmond, Wash., and so forth.

Also stored in the memory 310 may be one or more of the following modules. These modules may be executed as foreground applications, background tasks, daemons, and so forth.

A communication module 314 may be configured to establish communications with one or more of the sensors 120, one or more of the display devices 126, other servers 204, or other devices. The communications may be authenticated, encrypted, and so forth.

The memory 310 may store an inventory management module 316. The inventory management module 316 is configured to provide the inventory functions as described herein with regard to the inventory management system 122. For example, the inventory management module 316 may track items 104 between different inventory locations 114, to and from the totes 118, and so forth.

The inventory management module 316 may be configured to generate the user interface data 124 which may be used by the display device 126 to present the user interface 128. The inventory management module 316 may include one or more of a kinematic determination module 318, a color determination module 320, and a user interface module 322.

The kinematic determination module 318 is configured to generate kinematic data based at least in part on sensor data from the one or more sensors 120. For example, the kinematic determination module 318 may use image data to determine a direction the user 116 is facing. In another example, the kinematic determination module 318 may use sensor data acquired from sensors 120 associated with the user 116, such as a speed sensor onboard or otherwise associated with the tote 118 or an accelerometer 120(10) in a smart phone to determine a speed and any changes in direction by the user 116.

The color determination module 320 is configured to generate a color palette including one or more representative colors present in an image acquired by an imaging sensor 120(1) and stored as image data 332. The color determination module 320 may use one or more techniques to determine the representative color.

In one implementation, the color determination module 320 may generate a plurality of bins, wherein each bin spans a range of color values. The color values may include one or more of hue, saturation, brightness, red value, green value, blue value, alpha value indicative of opacity of a pixel, or other metric or indicia associated with pixels of an image. Continuing the example, a hue value may be read from every $n^{th}$ pixel of the image, where n is an integer value of 1 or greater. Each hue value may be placed into, or otherwise associated with, a corresponding bin. A count of the hue color values in the bins is performed. The bin having a greatest count may be designated as the representative color. A top k set of colors or range of colors as sorted by frequency of occurrence may be designated as representative colors as well.

In another implementation, the color determination module 320 may analyze pixels in the image data 332 to determine the color value having the greatest overall frequency of occurrence. The analysis may include all pixels, every $n^{th}$ pixel, assess only pixels within certain portions or regions of the image, such as a central portion of the image, and so forth.

In yet another implementation, the color determination module 320 may determine a presence of a count or sum of color values for a plurality of pixels which exceeds a threshold value. For example, the threshold may specify that when 25% or more of the pixels in the image exhibit hue color values which are in the range of green=100 and green=120, regardless of whether other colors have a high percentage, the user will perceive green as the representative color for that image. Thus, the color determination module 320 may designate the representative color as green=110.

In some implementations, the representative colors may be determined based at least in part on depth data or image change data. For example, the image data may include depth data such as from a range camera, and the colors of objects that are within a predetermined area of the inventory location 114 may be used. Other objects which are closer or farther away to the range camera may be disregarded for the representative color determination.

The color determination module 320 may be configured to determine the representative colors based upon one or more conditions. For example, the color determination module 320 may be configured to disregard from the determination of the representative color those colors having particular hues, brightness, and so forth. Continuing the example, the color of the inventory locations 114 (such as beige or white shelving) may be omitted from determination. In another example, particular color values, such as solid black or solid white may be disregarded from consideration during the determination of the representative color.

The user interface module 322 is configured to generate user interface data 124. The user interface data 124 may be based at least in part on the kinematic data, color palette data, or other information. As described above, the user interface data 124 is configured to provide the user interface 128 by way of one or more display devices 126. In one implementation, the user interface module 322 may animate the user interface 128 such that an amount of information presented is proportionate to or otherwise based upon a distance between one object and another object. For example, as the user 116 approaches an inventory location 114, the user interface module 322 may generate user interface data 124 configured to present on the display device 126 proximate to that inventory location 114 a first set of information at a first distance, and the second set of information at a second distance which is closer than the first. In this way, the user 116 perceives the user interface 128 from a distance and as they approach additional details are provided on the display device 128. Similarly, as the user 116 moves away from the inventory location 114 and the distance increases, the amount of information presented may be reduced until at a threshold distance the user interface 128 is discontinued on that display device 126.

The user interface module 322 may also use the color palette data determined by the color determination module 320 to generate the user interface data 124. For example, the color palette data may include a particular shade of red. One or more visual elements as expressed by the user interface data 124 may use the particular shade of red, or another color which is similar. Two colors may be deemed similar when they are within a pre-determined distance of one another in a defined color space color model. The color space may be expressed as red green blue (RGB), hue saturation and brightness (HSV), and so forth. For example, colors may be deemed close when within ten units in that color space of one another, thus the colors hex #780000 (RGB (120, 0, 0)) and hex #800000 (RGB (128, 0, 0)) may be considered close and may be used interchangeably while hex #780000 (RGB (120, 0, 0)) and hex #FF0000 (RGB (255, 0, 0)) are not deemed close. Continuing the example above, the representative color may be determined as hex #780000 (RGB (120, 0, 0)), and hex #800000 (RGB (128, 0, 0)) may be used in the user interface data 124 as a color value for one or more visual elements, such as a background color, colored bar, border, font color of text, graphic filters applied to graphics, and so forth.

The user interface module 322 may also be configured to generate user interface data 124 based at least in part on the height of the user 116. For example, the user interface data 124 may be configured to present the user interface 128 with the display devices 126 such that the user 116 is able to see the user interface 128.

In some implementations, the user interface module 322 may be configured to use random or pseudorandom values to modify the user interface data 124 which is generated. For example, the transition from one state to another in the user interface 128 may be variable. Continuing the example, the experience of the user 116 would be such that a first time they walk down the aisle 112 they may see the user interface 128 presented on the display device 126 with a fade-in effect, appearing on the display device 126 over a period of 300 ms. The next time the user 116 walks down the aisle 112, they may see the user interface 128 present the same information, but instead of the fade-in effect the user interface 128 may include a flash of color followed by text of the item name appearing to move into the user interface 128. By varying how the information is presented in the user interface 128, the user 116 may experience a degree of novelty or change which may be useful in garnering and maintaining attentiveness to the information presented.

Other modules 324 may also be present in the memory 310. For example, an object recognition module may be configured to use data from one or more of the sensors 120 to identify an object such as the item 104, the user 116, the tote 118, and so forth.

The memory 310 may also include a data store 326 to store information. The data store 326 may use a flat file, database, linked list, tree, executable code, script, or other data structure to store the information. In some implementations, the data store 326 or a portion of the data store 326 may be distributed across one or more other devices including other servers 204, network attached storage devices, and so forth.

The data store 326 may include physical layout data 328. The physical layout data 328 provides a mapping of physical positions within the physical layout of devices and objects such as the sensors 120, inventory locations 114, display devices 126, and so forth. For example, the physical layout data 322 may indicate the coordinates within the facility 102 of an inventory location 114 and an associated display device 126. In some implementations, the kinematic determination module 318 may access the physical layout data 328 to determine a distance between two objects, such as the user 116 and an inventory location 114.

The data store 326 may also include sensor data 330. The sensor data 330 comprises information acquired from, or based on, the one or more sensors 120. For example, the sensor data 330 may comprise three-dimensional information about an object in the facility 102. As described above, the sensors 120 may include an imaging sensor 120(1) which is configured to acquire one or more images. These images may be stored as image data 332. The image data 332 may comprise information descriptive of a plurality of picture elements or pixels.

Kinematic data 334 may also be stored in the data store 326. The kinematic data 334 may include, but is not limited to, position 334(1), direction 334(2), speed 334(3), distance 334(4), heading, posture, or other kinematic data 334(K). The kinematic data 334 may be descriptive of a single object, or may provide information about one object with respect to another. For example, the position 334(1) may be expressed in absolute terms or relative terms. Absolute terms may comprise a latitude, longitude, and altitude with respect to a geodetic reference point. Relative terms may include a position of 25.4 m along an x-axis and 75.2 m along a y-axis as designated by a floor plan of the facility 102, 5.2 m from an inventory location 114 along the heading of 169°, and so forth.

The direction 334(2) may include a direction orientation indicating a heading of the object while moving or stationary. The direction 334(2) may also include a direction of motion, such as an overall direction traveled by the user 116 or the tote 118 while moving. The direction orientation and the direction of motion may differ. For example, the user 116 may have a gaze direction orientation looking to the left while walking straight ahead.

Kinematic threshold data 336 may also be stored in the data store 326. The kinematic threshold data 336 provides information indicative of one or more threshold values or ranges which may be used by the user interface module 322 to generate the user interface data 124. The kinematic threshold data 336 may include one or more of: a maximum distance to present information to the user 116, an angle relative to the user 116 within which the user interface 128 is to be presented, speed thresholds for presentation of different levels of information, and so forth. For example, the kinematic threshold data 336 may specify that the user interface data 124 will include an item name and an item SKU for presentation as the user interface 128 when an object such as a user 116 or a tote 118 is within a threshold distance range of 10 m to 5 m.

One or more of an administrator, programmer, or automated process may define the kinematic threshold data 336. For example, the inventory management module 316 may include a machine learning module configured to adjust kinematic threshold data 336 based at least in part on interaction of one or more of the users 116 with the facility 102. Continuing the example, the machine learning module may be configured to determine that picking accuracy is improved when the threshold distance range is adjusted to 12 m to 3 m from an initial range of 10 m to 5 m.

Color palette data 338 is generated by the color determination module 320 or acquired from another source and may also be stored in the data store 326. The color palette data 338 comprises information indicative of one or more colors, or range of colors. For example, the color palette data 338 may include a set of hexadecimal color values, color designations with regard to a particular color space such as RGB or HSB, and so forth. The color palette data 338 may include one or more of the representative colors determined by the color determination module 320.

The data store 326 may also include item data 340 comprising information associated with the items 104. The information may include one or more inventory locations 114, at which one or more of the items 104 are stored. The item data 340 may also include SKU or other product identifier, price, quantity on hand, weight, expiration date, images of the item, colors associated with trademarks or trade dress, detail description information, ratings, ranking, and so forth. The inventory management module 316 may store information associated with inventory management functions in the item data 340. In some implementations, the item data 340, or portions thereof, may be associated with a particular user 116 or group of users. For example, a particular user 116 may be allergic to certain materials and may be provided with a user interface 128 which indicates an item 104 contains those allergens.

As described above, the user interface data 124 may comprise commands, instructions, tags, markup language, images, color values, or other data. For example, the user interface data 124 may comprise one or more files including HTML, CSS, or JavaScript components.

The data store 326 may store other data 342 as well, such as user preferences, configuration files, permissions associated with user accounts, and so forth. In one implementation, the other data 342 may include user interface preferences indicative of what information to include or exclude in the user interface data 124, preferred transitions, preferred kinematic thresholds, and so forth. For example, the user 116 may set user interface preferences indicating a desire for a "low power experience", such that the kinematic thresholds are reduced, display devices 126 are activated at lower power levels (such as with dimmer screens), and so forth. In another example, the user 116 may set their user interface preferences such that the preferred transitions between states of the user interfaces 128 occur over one second and do not use animation. In yet another example, the user interface preferences may specify the kinematic threshold data 336 such that general information is presented at a range of 3 meters and detail information is presented at a range of 2 meters.

The user interface preferences may be manually set or may be automatically determined based on user feedback. For example, the automatic determination may use input by the user 116 to change information on the display devices 126 to modify future behavior. Continuing the example, the user 116 may provide input to change the user interface 128 to include a quantity per package and omit weight information. Based on the user 116 making these selections, the user interface preferences associated with that user 116 may be changed. At subsequent interactions, the user 116 will see a user interface 128 which presents quantity per package and omits weight information.

The other data 342 may also include information about other objects in the facility 102. The objects may include the users 116, the totes 118, robots, equipment, and so forth. The information may include type of object, RF tag identifier, object size data, identification characteristics, and so forth. For example, the object data may indicate that the object is a user 116, is associated with the RF tag identifier of "Z93", and that the user 116 has a height of 6.1 meters. Continuing the example, the object data may also associate the object with a particular user account, device account, and so forth.

The server 204 may also include a power supply 344. The power supply 344 is configured to provide electrical power suitable for operating the components in the server 204.

Figure 4:
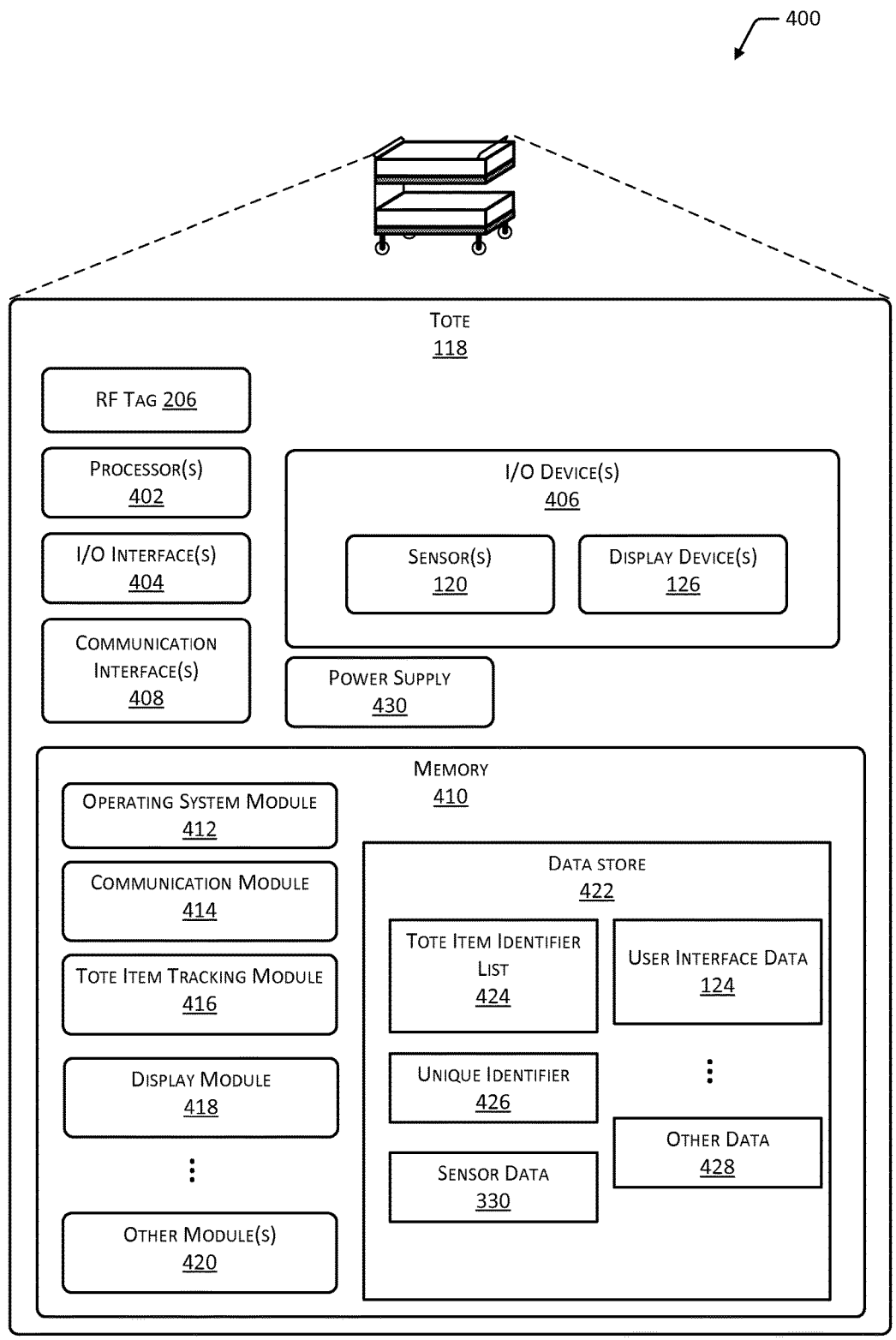
FIG. 4 is a block diagram of a tote, according to some implementations.

FIG. 4 illustrates a block diagram 400 of the tote 118, according to some implementations. The tote 118 may include an RF tag 206. The RF tag 206 may be affixed to, integral with, or is otherwise associated with the tote 118. In some implementations, the tote 118 may have identifiers, tags, or other indicia thereupon. For example, a machine-readable optical code, such as a barcode, may be affixed to a side of the tote 118.

The tote 118 may include one or more hardware processors 402 (processors) configured to execute one or more stored instructions. The processors 402 may comprise one or more cores. The tote 118 may include one or more I/O interface(s) 404 to allow the processor 402 or other portions of the tote 118 to communicate with other devices. The I/O interfaces 404 may include I2C, SPI, USB, RS-232, and so forth.

The I/O interface(s) 404 may couple to one or more I/O devices 406. The I/O devices 406 may include one or more of the input devices such as the sensors 120. As described above, the sensors 120 may include weight sensors 120(6), RFID readers 120(8), and so forth. The I/O devices 406 may also include haptic output devices 212(1), audio output devices 212(2), display devices 126, and so forth. In some implementations, input and output devices may be combined. For example, a touchscreen display may incorporate a touch sensor 120(4) and a display device 126. In some embodiments, the I/O devices 406 may be physically incorporated with the tote 118 or may be externally placed.

The tote 118 may also include one or more communication interfaces 408. The communication interfaces 408 are configured to provide communications between the tote 118 and other devices, such as other totes 118, routers, access points, the servers 204, and so forth. The communication interfaces 408 may include devices configured to couple to PANs, LANs, WANs, and so forth. For example, the communication interfaces 408 may include devices compatible with Ethernet, Wi-Fi, Bluetooth, ZigBee, and so forth.

The tote 118 may also include one or more busses or other internal communications hardware or software that allow for the transfer of data between the various modules and components of the tote 118.

As shown in FIG. 4, the tote 118 includes one or more memories 410. The memory 410 comprises one or more CRSM as described above. The memory 410 provides storage of computer readable instructions, data structures, program modules, and other data for the operation of the tote 118. A few example functional modules are shown stored in the memory 410, although the same functionality may alternatively be implemented in hardware, firmware, or as a SOC.

The memory 410 may include at least one OS module 412. The OS module 412 is configured to manage hardware resource devices such as the I/O interfaces 404, the I/O devices 406, the communication interfaces 408, and provide various services to applications or modules executing on the processors 402. The OS module 412 may implement a variant of the FreeBSD operating system as promulgated by the FreeBSD Project, other UNIX or UNIX-like variants, a variation of the Linux operating system, such as Android as promulgated by Google Inc. of Mountain View, Calif. Other OS modules 412 may be used, such as the Windows operating system from Microsoft Corporation of Redmond, Wash., the LynxOS from LynuxWorks of San Jose, Calif., and so forth.

Also stored in the memory 410 may be one or more of the following modules. These modules may be executed as foreground applications, background tasks, daemons, and so forth.

A communication module 414 may be configured to establish communications with one or more of the sensors 120, display devices 126, the servers 204, or other devices. The communications may be authenticated, encrypted, and so forth.

The memory 410 may also store a tote item tracking module 416. The tote item tracking module 416 is configured to maintain a list of items 104, which are associated with the tote 118. For example, the tote item tracking module 416 may receive input from a user 116 by way of a touch screen display with which the user 116 may enter information indicative of the item 104 placed in the tote 118. In another example, the tote item tracking module 416 may receive input from the I/O devices 406, such as the weight sensor 120(6) and an RFID reader 120(8). The tote item tracking module 416 may send the list of items 104 to the inventory management system 122. The tote item tracking module 416 may also be configured to receive information from the inventory management system 122. For example, a list of items 104 to be picked may be presented within a user interface 128 on the display device 126 of the tote 118.

The memory 410 may include a display module 418. The display module 418 may be configured to process the user interface data 124 generated onboard the tote 118, or received from one or more of the servers 204 or other devices and present the user interface 128 on a display device 126. For example, the display module 418 may parse the user interface data 124 and direct the display device 126 on the tote 118 to present the user interface 128.

In some implementations, the functionality provided by the display module 418 may be implemented as output device control circuitry. A device control circuitry may be coupled to the communication interface 408 and be configured to activate one or more of the display devices 126. The activation may be based at least in part on output from the communication interface 408. For example, device control circuitry may include a microcontroller or relay which is configured to provide current to one or more of segments of a segmented display device 126 upon receiving a radio signal. In other implementations, the output device control circuitry may comprise one or more microcontrollers, application specific integrated circuits, and so forth.

Other modules 420 may also be stored within the memory 410. In one implementation, a kinematic data handler module may be configured to generate kinematic data 334 indicative of the user 116, the tote 118, or another one or more objects in range of the sensors 120 of the tote 118. For example, the kinematic data handler module may be configured to acquire data from one or more speed sensors 120 and provide that sensor data 330 to the kinematic determination module 318 of the server 204.

The other modules 420 may also include a user authentication module which may be configured to receive input and authenticate or identify a particular user 116. For example, the user 116 may enter a personal identification number or may provide a fingerprint to the fingerprint reader to establish their identity.

The memory 410 may also include a data store 422 to store information. The data store 422 may use a flat file, database, linked list, tree, executable code, script, or other data structure to store the information. In some implementations, the data store 422 or a portion of the data store 422 may be distributed across one or more other devices including the servers 204, other totes 118, network attached storage devices, and so forth.

The data store 422 may store a tote item identifier list 424. The tote item identifier list 424 may comprise data indicating one or more items 104 associated with the tote 118. For example, the tote item identifier list 424 may indicate the items 104 which are present in the tote 118. The tote item tracking module 416 may generate or otherwise maintain a tote item identifier list 424.

A unique identifier 426 may also be stored in the memory 410. In some implementations, the unique identifier 426 may be stored in rewritable memory, write-once-read-only memory, and so forth. For example, the unique identifier 426 may be burned into a one-time programmable non-volatile memory, such as a programmable read-only memory (PROM). In some implementations, the unique identifier 426 may be part of a communication interface 408. For example, the unique identifier 426 may comprise a media access control address associated with a Bluetooth interface.

The data store 422 may also store sensor data 330. The sensor data 330 may be acquired from the sensors 120 onboard the tote 118. The user interface data 124 received by the tote 118 may also be stored in the data store 422.

Other data 428 may also be stored within the data store 422. For example, tote configuration settings, user interface preferences, and so forth, may also be stored.

The tote 118 may include a frame or other structure. For example, the frame may comprise one or more of metal, plastic, ceramic, or composite materials. The frame may be substantially rigid or otherwise be sufficient to carry one or more items 104. In other implementations, the frame may be flexible, such as in a bag.

The tote 118 is configured to provide one or more item stowage areas. For example, the frame may form the item stowage area. The item stowage areas may include platforms, receptacles, cubbyholes, baskets, shelves, wells, or other features or apparatus to maintain one or more items 104 within the tote 118. The item storage area is configured to contain one or more items 104 as loaded by the user 116, or another agency such as a robot or automated equipment.

One or more wheels may be attached to the frame. The user 116 or another agency (such as a robot) may push or pull the tote 118 to move the tote 118 throughout the facility 102. One or more handgrips may be coupled to, or an extension of, the frame. The handgrip provides a point at which the user 116 may move the tote 118. The handgrip may comprise one or more pieces or bars.

The tote 118 may also include a power supply 430. The power supply 430 is configured to provide electrical power suitable for operating the components in the tote 118. The power supply 430 may comprise one or more of photovoltaic cells, batteries, wireless power receivers, fuel cells, capacitors, and so forth.

Figure 5:
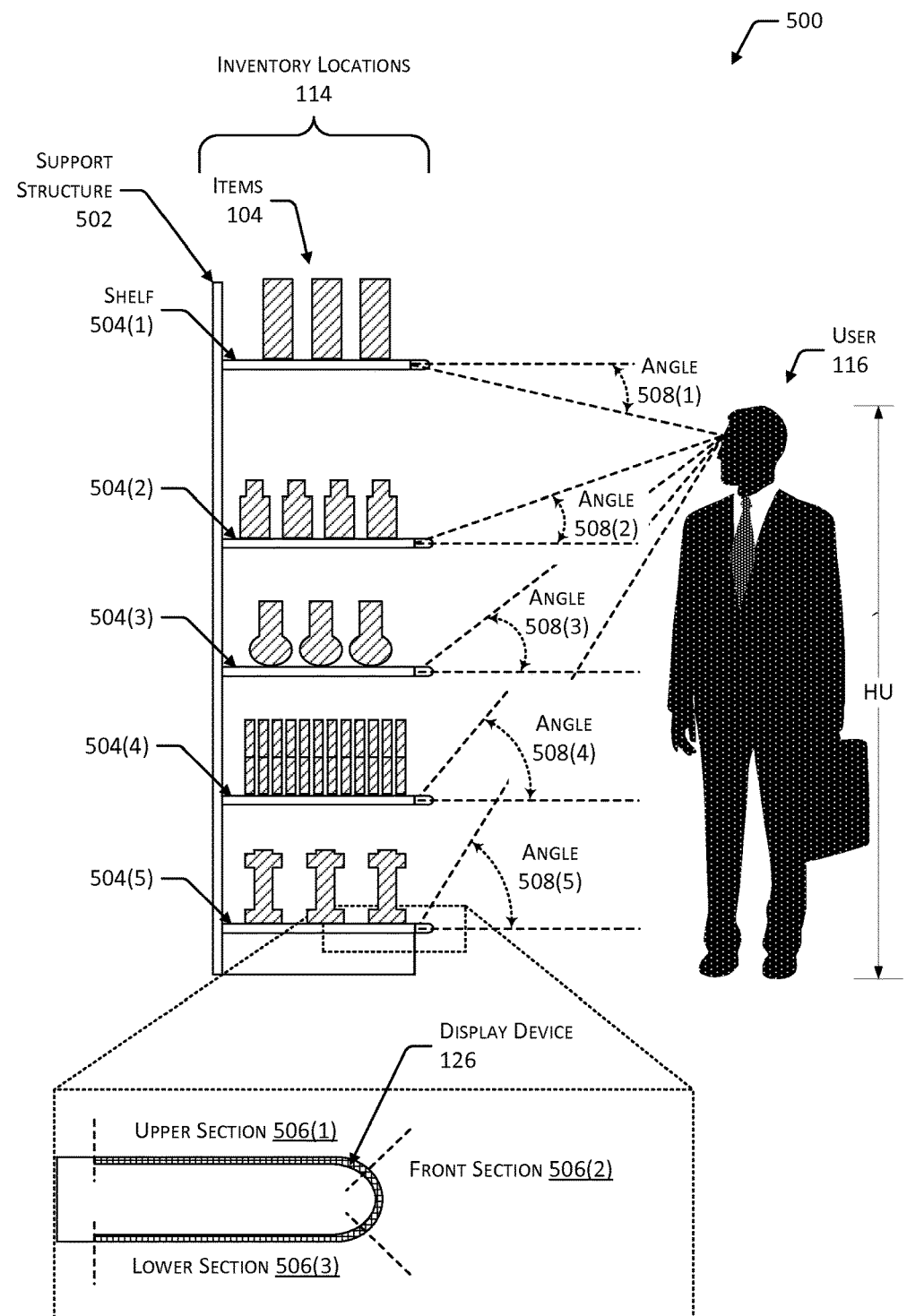
FIG. 5 illustrates an inventory location with edge mounted display devices, according to some implementations.

FIG. 5 illustrates one implementation 500 of an inventory location 114 with display devices 126 mounted on an edge of the shelving. In this illustration, inventory locations 114 comprising a support structure 502 and a plurality of shelves 504 are depicted. The support structure 502 maintains the shelves 504, which in turn support items 104.

The shelves 504 may include one or more display devices 126 arranged along at least a portion of the shelf 504. The display devices 126, or portions thereof, may include an upper section 506(1), a front section 506(2), and a lower section 506(3).

As depicted here, the shelf 504 may have an edge which is proximate to the user 116 during operation which has a rounded or bullnose profile. The display device 126 for each of the shelves 504 may conform to the surface of the shelf 504 or otherwise be supported by an appropriate mechanical structure. For example, the display device 126 may comprise a transparent OLED display 126(2) which overlays another surface. Continuing the example, the surface may include wood or a simulated wood pattern such that when the transparent OLED 126(2) (or a portion thereof) is active, the user interface 128 is visible, and when inactive, the underlying material such as the wood is visible.

While a rounded profile is depicted, in some implementations, the edge of the shelf 504 which is proximate to the user 116 may be flat or faceted. In some implementations, the display device 126 may be mounted on an articulable mechanism and be configured to move along at least one axis of motion. For example, the display device 126 may comprise a linear actuator configured to pan, tilt, rotate, or a combination thereof, the display device 126 to facilitate viewing by the user 116.

The inventory management module 316 may be configured to determine an angle 508 between the shelf 504 and a portion of the user 116. As illustrated here, the angle 508 is relative to an origin associated with the shelf 504 and extending between a horizontal line extending from the shelf 504 and the user's 116 eyes. The angle 508 may be based on a predetermined height assumed for all users 116, or may be based on actual height acquired using sensor data 330, user input, or another information source. The angle 508 may be based on a predetermined distance between the display device 126 and the user 116, or may be based on a measurement of the actual distance using sensor data 330.

Based at least in part on the angle 508, the user interface module 322 is configured to generate user interface data 124 which will present the user interface 128 at one or more of the sections 506. For example, an uppermost shelf 504(1) is located at a height above that of the eyes of the user 116. As a result, an angle 508(1) is a negative angle and based upon this negative angle, the user interface 128 may be presented on the front section 506(2) and the lower section 506(3). By presenting on the front section 506(2) and the lower section 506(3) the user 116 is able to see the user interface 128.

In comparison, a lowermost shelf 504(5) presents a positive angle 508(5), and based on the magnitude of the angle 508(5), the user interface module 322 may provide a user interface data 124 configured to present the user interface 128 using the upper section 506(1). The user interface 128 and its associated information is not presented on the front section 506(2) or the lower section 506(3), as it is deemed unsuitable for use by the user 116. For example, the angle may be too extreme relative to a central display angle of the display device 126 such that any information presented in that section 506 would be illegible or not visible.

Thresholds indicating particular angles 508 and corresponding sections 506 to use in the presentation of the user interface 128 may be specified. For example, a threshold may specify that an angle 508 which is plus or minus 25 degrees uses the front section 506(2), while an angle 508 which is greater than minus 25 degrees uses the lower section 506(3).

Figure 6:
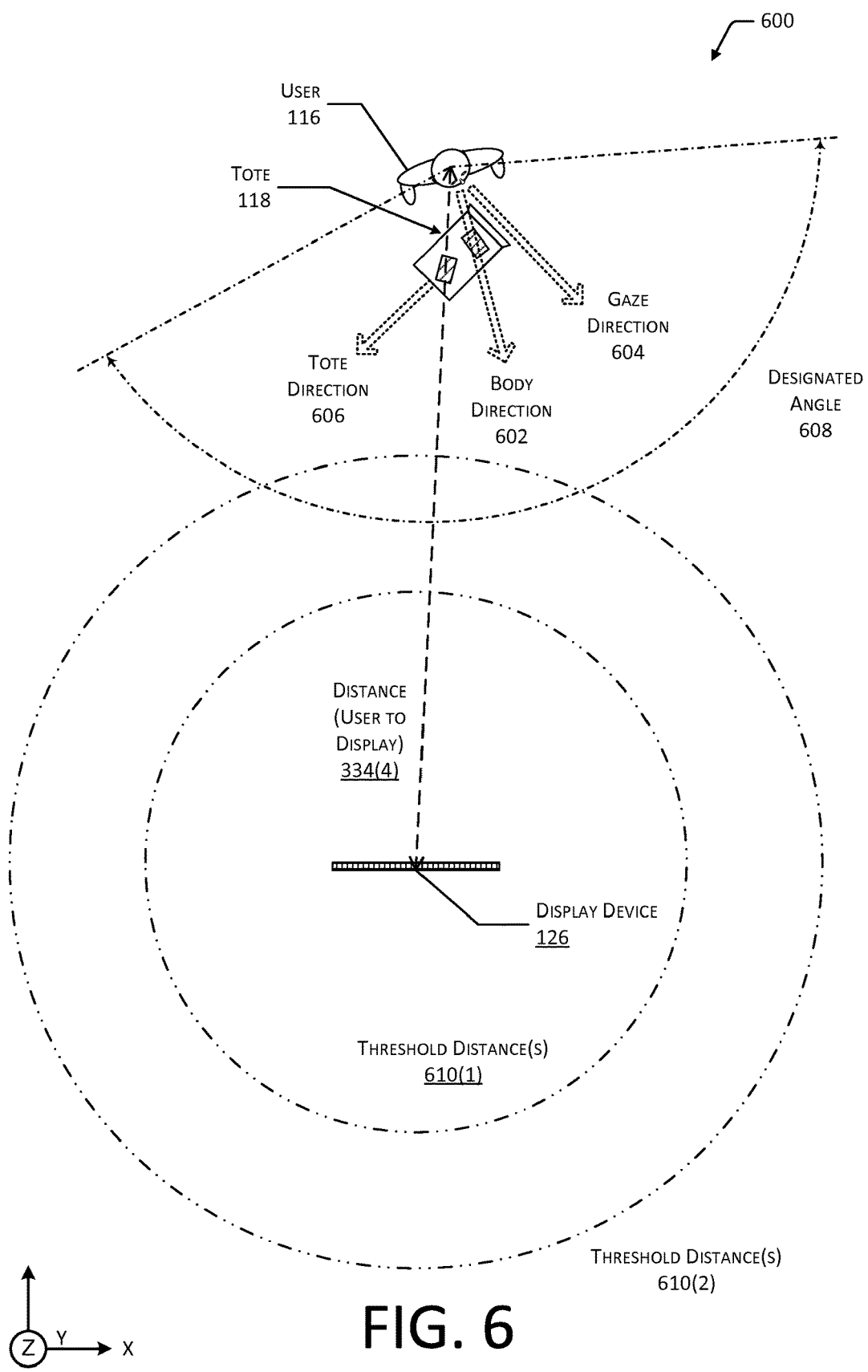
FIG. 6 illustrates a user in relation to structures of the facility, according to some implementations.

FIG. 6 illustrates a plain view 600 of the user 116 in relation to structures of the facility 102, according to some implementations. In this illustration, the user 116 and the tote 118 are depicted. Each of these objects may have kinematic data 334 and kinematic threshold data 336 associated therewith. As described above, the kinematic data 334 may include information indicative of direction 334(2). This may include a direction orientation, direction of motion, and so forth. The direction 334(2) may be determined using a variety of techniques. One technique uses one or more images, such as acquired by the imaging sensors 120(1). One or more features of the object in the one or more images may be determined, such as the face of a user 116, optical tags on the tote 118, and so forth. By analyzing the relative arrangement of these features, the direction 334(2) may be determined. Another technique uses an onboard sensor, such as the magnetometer 120(11).

Described in this illustration are direction orientations which may apply to the object while at rest or in motion. For example, the user 116 has a body direction 602. The body direction 602 comprises an overall orientation of the user 116. For example, the body direction 602 may be based on the configuration of the hips, shoulders, and feet of the user 116 at a given instant in time. The body direction 602 may be determined in one implementation by the kinematic determination module 318 using sensor data 330 such as image data 332, point cloud data from a 3D sensor 120(2), and so forth. For example, the sensor data 330 (such as images from the imaging sensor 120(1)) may be used to locate different features on the body of the user 116, such as the shoulders, face, legs, head, and so forth. Based on this information and a predetermined biophysical model of human anatomy, the body direction 602 may be calculated. In another implementation, the user 116 may be equipped with a magnetometer 120(11) configured to act as a compass and provide information indicative of which way the user 116 is oriented.

A gaze direction 604 provides an indication of which direction the user 116 is looking. For example, the gaze direction 604 may indicate that the user 116 is looking straight ahead and slightly to the left of center, relative to their skull. The gaze directions 604 may be determined in one implementation by the kinematic determination module 318 using sensor data 330 such as from a wearable computing device, image data 332 from the imaging sensors 120(1) in the facility 102, and so forth. For example, the wearable computing device may include an optical eye tracking system configured to use visible or infrared light to acquire an image of the user's 116 eye during operation and determine a direction of the gaze. In another example, the imaging sensors 120(1) in the environment may acquire an image of the user's 116 eye during operation, determine the configuration of the user's 116 eye and calculate the direction therefrom. Continuing this example, given a known location of the imaging sensor 120(1), should the image of the user 116 show the full face of the user 116 with the eyes in the configuration associated with looking to the user's 116 left, the gaze direction 604 may be determined. In yet another example, an eye tracker worn on the user's 116 head may measure electrical patterns associated with eye movement, such as with an electrooculogram.

A tote direction 606 indicates a direction the tote 118 is oriented. The tote direction 606 may be determined in one implementation by the kinematic determination module 318 using sensor data 330 such as image data 332 from the imaging sensors 120(1) in the facility 102, the magnetometer 120(11) onboard the tote 118, and so forth. For example, the magnetometer 120(11) mounted to the tote 118 may act as a compass and provide information indicative of which way the tote 118 is oriented. In another implementation, optical tracking targets on an exterior of the tote 118 may be detected by the imaging sensors 120(1) to determine the orientation.

The kinematic data 334 may also include a distance 334(4) between two objects. In this illustration, the distance 334(4) indicates a distance between the user 116 and a display device 126. In other implementations, distances may measure between the user 116 and the inventory location 114, the tote 118 and the display device 126, the tote 118 and the inventory location 114, and so forth.

The kinematic threshold data 336 defines conditions or parameters which the user interface module 322 may use to generate user interface data 124. The kinematic threshold data 336 may include a designated angle 608. The designated angle 608 provides information indicative of a perceptual space of the user 116. For example, the designated angle 608 may be defined as an angle relative to the user 116 or a portion thereof, within which the user interface 128 is visible. In some implementations, the designated angle 608 may be specific to a particular user 116, or may be a predetermined value such as 180° which is used as a default for one or more users 116.

In some implementations, the designated angle 608 may be associated with the body direction 602, the gaze direction 604, with another direction associated with the user 116 such as a head direction, or with a direction associated with another object such as the tote direction 606.

One or more threshold distances 610(1), 610(2), . . . , 610(M) may also be defined in the kinematic threshold data 336. The threshold distance 610 may specify a minimum, maximum, or range of distances at which particular elements of the user interface 128 are presented. For example, at a distance 334(4) beyond the threshold distance 610(2), the user interface 128 may present a first set of information, such as SKU. Continuing the example, as the user 116 approaches and the distance 334(4) is reduced to between the threshold distance 610(1) and 610(2), the second set of information such as the SKU, item name, and so forth, may be presented. The threshold distances 610 are depicted here as circular by way of illustration, and not as a limitation. In other implementations, the threshold distances 610 may be descriptive of different polygons, designate particular areas within the facility 102, and so forth.

The user interface module 322 may use the kinematic data 334 and the kinematic threshold data 336 to determine one or more of what information is presented in the user interface 128, when the information is presented in the user interface 128, how the information is presented in the user interface 128, and so forth. For example, the user interface module 322 may be configured to present the user interface 128 when the display device 126 is within the designated angle 608, and within a threshold distance 610.

As described above, the kinematic data 334 may include information such as speed, velocity, acceleration, and so forth. For example, the kinematic data 334 may indicate a direction the user 116 is moving as well as the speed. In some implementations, the kinematic data 334 may comprise data at an instant in time, a time series of data, or a combination thereof. The kinematic data 334 may be descriptive of scalar or vector values.

Figure 7:
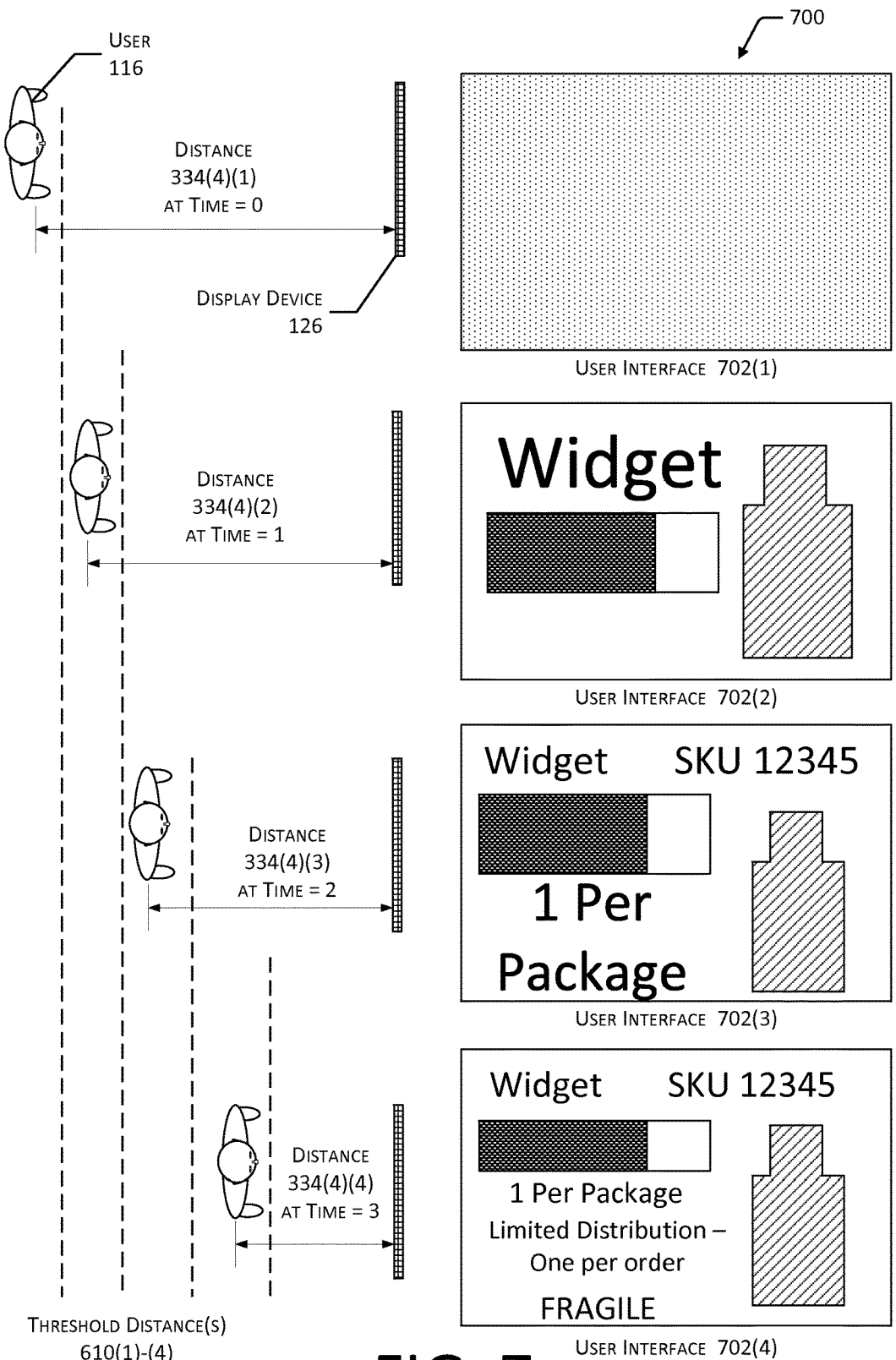
FIG. 7 illustrates a scenario depicting a user interface dynamically changing the information presented based on a distance between the user and the display device, according to some implementations.

FIG. 7 illustrates a scenario 700 depicting the user interface 128 dynamically changing the information presented based on a distance between the user 116 and the display device 126, according to some implementations.

A series of user interfaces 702(1), 702(2), 702(3), and 702(4) are presented in sequence of increasing time, such that user interface 702(1) is presented before 702(2) and so forth. Also depicted are the user 116 and the display device 126 at successively decreasing relative distance between the two. A series of threshold distances 610(1), 610(2), 610(3), and 610(4) are also depicted at successively decreasing distances relative to the display device 126. For example, the threshold distance 610(1) is the farthest while the threshold distance 610(4) is the closest to the display device 126.

At time=0 and distance 334(4)(1), the user 116 is relatively distant from the display device 126. The display device 126 may be inactive, in a low power state, or be presenting a blank or default user interface 702(1), based at least in part on the user 116 having a position in the facility 102 which is beyond the threshold distance 610(1).

At time=1 and distance 334(4)(2), the user 116 has approached the display device 126 and is now between the threshold distance 610(1) and 610(2). Based at least in part on this position of the user 116 within a threshold distance 610, user interface module 322 generates the user interface data 124 configured to present the user interface 702(2) showing some information, such as the name of the item 104 in various visual indicators.

At time=2 and distance 334(4)(3), the user 116 has approached still closer to the display device 126 and is now between the threshold distance 610(2) and 610(3). Based at least in part on this positioning, the user interface 702(3) now presents additional information, such as the name of the item 104, a SKU, various visual indicators, and packaging information.

At time=3 and distance 334(4)(4), the user 116 has approached even closer to the display device 126 and is now between the threshold distance 610(3) and 610(4). Based at least in part on this positioning, the user interface 702(4) now presents numerous pieces of information, including the name of the item 104, a SKU, various visual indicators, packaging information, handling information, and so forth.

As illustrated here, the size or the area, or both of user interface elements such as text, graphics, and so forth, may be proportionate to or based at least in part on the distance 334(4). For example, as the user 116 approaches the display device 126, the size of the fonts used in the user interface 702 may decrease and the amount of information presented in the user interface may increase.

As described above, the inventory management module 316 may generate user interface data 124 configured to provide the user interfaces 702. As a result, the user 116 would experience the user interface 702 being presented as they approach, with additional information being displayed as the relative distance between the two decreases. In some implementations, the transition effect may be used between the user interface 128 presenting one set of information and another. For example, the transition from the user interface 702(1) to 702(2) may comprise a fade-in effect which occurs over 200 ms. In another example, the transition from the user interface 702(3) to 702(4) may be animated such that the font size of text information decreases over time and the additional information to be presented appears to expand into place in the user interface 128. In some implementations where multiple users 116 are present, the kinematic threshold data 336 may specify the use of the distance 334(4) of the closest user 116.

Figure 8:
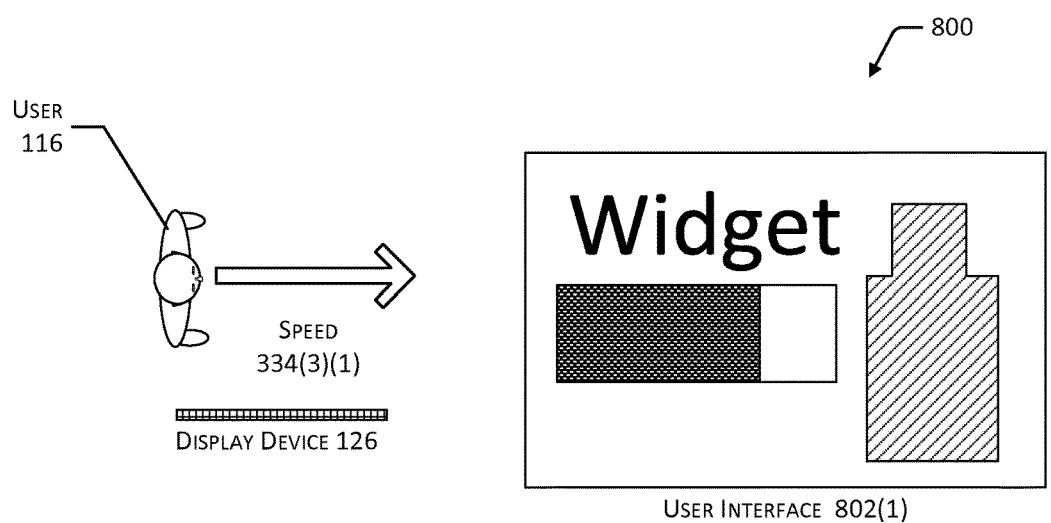
FIG. 8 illustrates several scenarios in which the user interface dynamically changes the information presented based on a speed of the user, according to some implementations.
Figure 8:
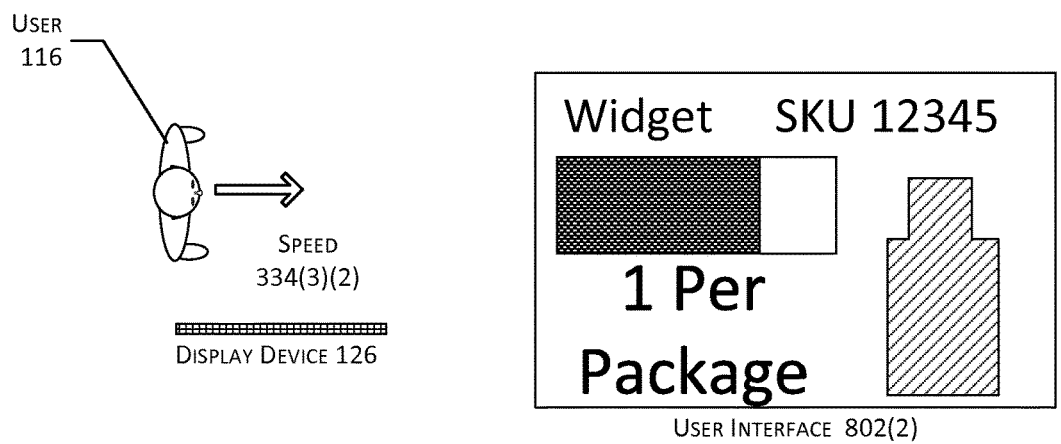
Figure 8:
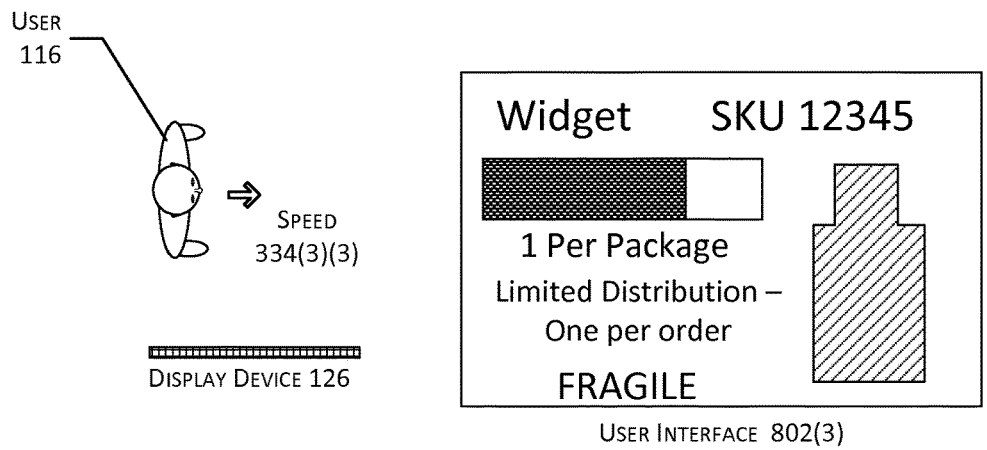

FIG. 8 illustrates several scenarios 800 in which the user interface 128 dynamically changes the information presented based on a speed of the user 116, according to some implementations.

In a first scenario, the user 116 is moving at speed 334(3)(1) past the display device 126. In this illustration, the relative size of the speed arrows is indicative of a magnitude of the speed. For example, larger arrows indicate greater speed. Based at least in part on the speed 334(3)(1), a user interface 802(1) is presented. The user interface 802(1) presents some information, such as the name of the item 104 and various visual indicators.

In a second scenario, the user 116 is moving at speed 334(3)(2) past the display device 126. The speed 334(3)(2) is less than the speed 334(3)(1). Based at least in part on the speed 334(3)(2), a user interface 802(2) is presented. The user interface 802(2) now presents additional information, such as the name of the item 104, a SKU, various visual indicators, and packaging information.

In a third scenario, the user 116 is moving a speed 334(3)(3) past the display device 126. The speed 334(3)(3) is less than the speed 334(3)(2). Based at least in part on the speed 334(3)(3), a user interface 802(3) is presented. With the user 116 moving relatively slowly, the user interface 802(3) now presents numerous pieces of information, including the name of the item 104, a SKU, various visual indicators, packaging information, handling information, and so forth.

The speed 334(3) of the user 116 may be based on the sensor data 330 described above. In one implementation, the imaging sensors 120(1) may acquire a set of images, such as 10 frames. A position of an object, such as the user 116, may be determined using the set of images. For example, the user's 116 head may be detected in the images, and tracked through the facility 102. Based on the change in position of the object, such as the movement of the user's 116 head between the 10 frames, a speed 334(3) of the object may be calculated.

The speed 334(3) may be relative to the display device 126, a point of reference within the facility 102, or an external point of reference. For example, the speed 334(3) may be measured with respect to the aisle 112.

In some implementations, should the user 116 reduce speed 334(3), the user interface 802 may transition to present additional information. Similarly, should the user 116 increase speed 334(3), the user interface 802 may transition to present less information.

As described above, the inventory management module 316 may generate user interface data 124 configured to provide the user interfaces 802. Transition effects may be used as the user interface 802 changes from presenting a first set of information to a second set of information. In some implementations where multiple users 116 are present, the kinematic threshold data 336 may specify the use of the speed 334(3) of the slowest user 116.

FIGS. 7 and 8 illustrate the use of distance 334(4) and speed 334(3), respectively, to determine what information is presented in the user interface 128 and at what time. It is understood that in some implementations different combinations of kinematic data 334 may be used to generate the user interface data 124. For example, the user interface data 124 and a corresponding user interface 128 may be presented based on the distance 334(4), speed 334(3), direction 334(2), and so forth.

Furthermore, the user interface data 124 may be based at least in part on information associated with the user 116. This information may include demographics, user preferences, and so forth. For example, the user 116 may prefer text to have a minimum font size. Based on this information, the user interface 128 may present particular text at or greater than the minimum font size for that user 116.

Figure 9:
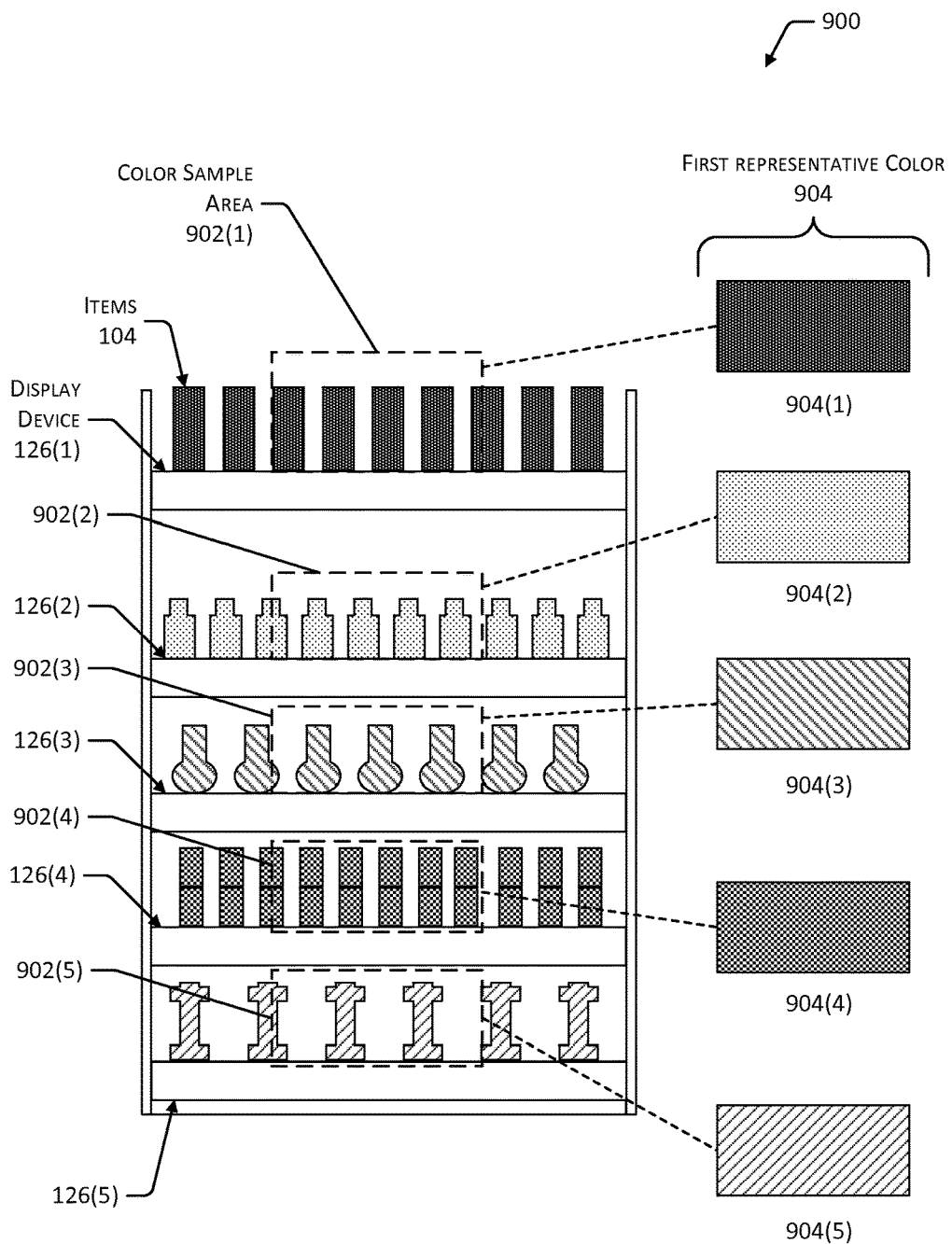
FIG. 9 illustrates inventory locations of which first representative colors are determined, according to some implementations.

FIG. 9 illustrates a front view 900 of inventory locations 114 for which first representative colors are determined, according to some implementations. As described above, the color determination module 320 may be configured to determine a representative color or other color palette data 338 associated with an inventory location 114.

In this illustration, the inventory locations 114 comprise five shelves 504(1)-(5) which are not visible, but upon which the items 104 are resting. Mounted on a front of each of the shelves 504, or integral to each of the shelves 504, is one or more display devices 126. In this illustration, each shelf 504 has a single display device 126. However, in some implementations, a plurality of display devices 126 may be used for each of the shelves 504. The display devices 126 arranged on the front of the shelves 504 may be contiguous, or separated from one another.

As illustrated here, the shelves 504 are holding various items 104. The display devices 126 may be configured to provide the user interfaces 128. The user interfaces 128 may include information about the items 104, promotional materials such as advertisements, notification information directed to the user 116, information about the facility 102 such as an indication of a fire alarm, weather information, entertainment content, and so forth.

Each of the shelves 504 and the corresponding items 104 resting thereon presents a particular palette of colors. This palette may be the combined result of packaging of the items 104, the back panel of the shelving, ambient lighting, shadows, empty spaces resulting from previously picked items 104, and so forth.

One or more sensors 120, such as imaging sensors 120(1), may be configured to acquire data from one or more color sample areas 902. The color sample areas 902 include at least a portion of the inventory locations 114. The color sample areas 902 may be predetermined or may be dynamically adjusted. Image data 332 for the color sample areas 902 are generated by the imaging sensors 120(1). For example, a camera may be configured to acquire an image of at least a portion of one or more shelves 504.

The color determination module 320 processes the image data 332 associated with the color sample area 902 and determines one or more representative colors 904. Different representative colors 904 may be determined for different color sample areas 902, and their corresponding different inventory locations 114. For example, as depicted here, the color sample area 902(1) includes images of items 104 having a red packaging. The resulting representative color 904(1) is thus determined to be red. The representative color 904 may be the same color as that provided by the color sample area 902, or maybe an approximation thereof. For example, the display device 126 may have a limited number of colors which may be displayed, and a closest color available for output by the display device 126 may be designated as the representative color 904.

Due to differences in packaging, spacing, lighting, and so forth, different shelves 504 and their corresponding different color sample areas 902 may have different representative colors 904. For example, the bottommost shelf which presents items 104 having green packaging as depicted in the color sample area 902(5) provides a different representative color 904(5) of green compared to that of the representative color 904(2) which is red.

In some implementations, the user interface module 322 may use the color palette data 338 which includes the representative color 904 to generate the user interface data 124. For example, the corresponding user interface 128 may be configured to use one or more visual elements which are the same or similar to the representative color 904. The similarity between colors of the user interface 128 and the colors at the inventory location 114 such as the portion of the shelf 504 included in the color sample area 902 provide a visual cue to the user 116. This visual cue may allow the user 116 to more readily identify the user interface 128 or portion thereof which includes information about a particular item or the associated inventory location 114.

While this illustration uses shelves 504 and depicts one type of item 104 on each shelf 504, it is understood that the inventory locations 104 may comprise other structures and may store different items 104 adjacent to one another. For example, pegboards or cubbyholes may be used to store the items 104. In another example, different types of items 104 may rest on the same shelf 504 adjacent to one another.

Figure 10:
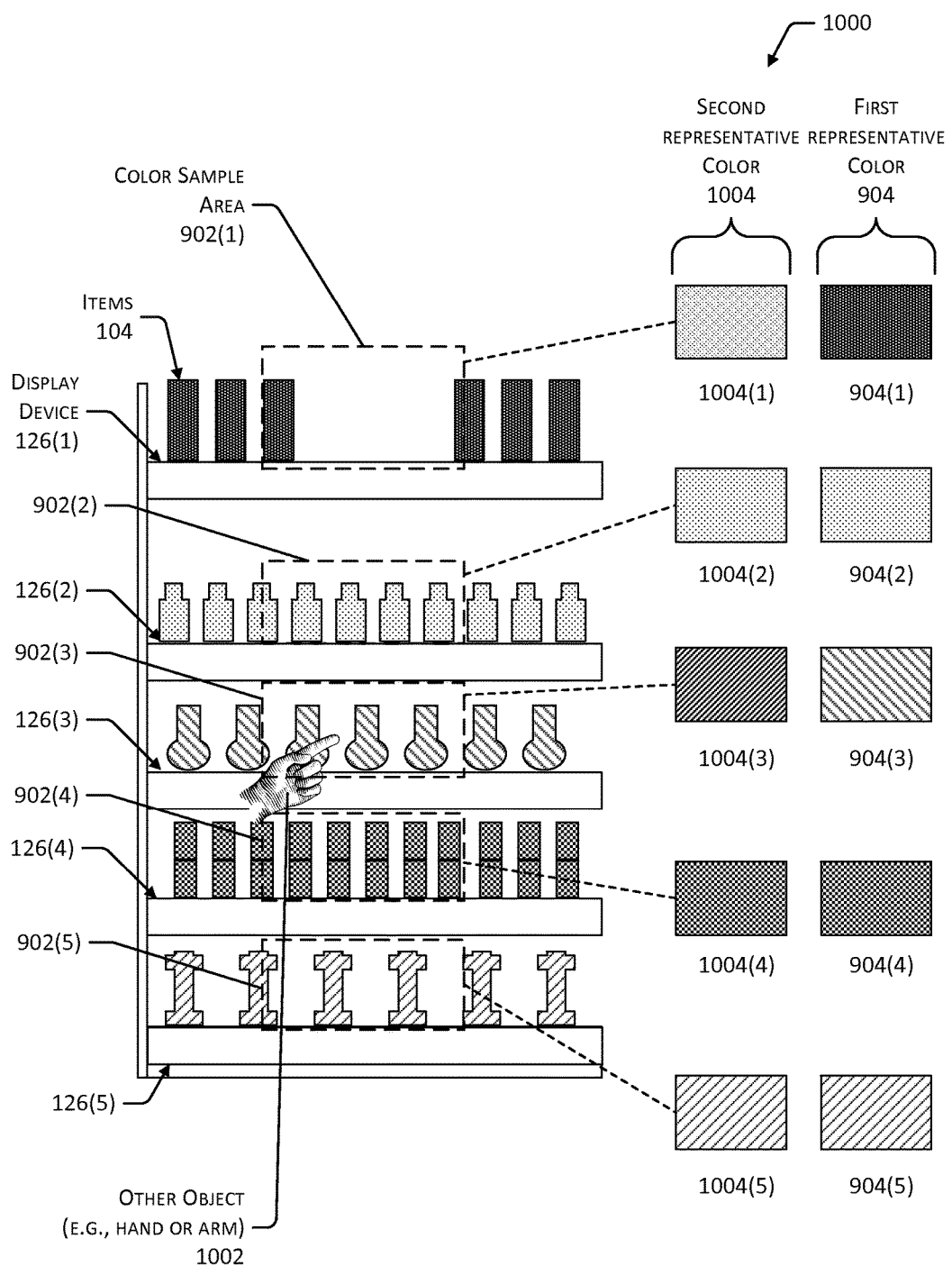
FIG. 10 illustrates the inventory locations of FIG. 9 in which second representative colors are determined, according to some implementations.

FIG. 10 illustrates a front view 1000 of the inventory locations of FIG. 9 in which second representative colors are determined, according to some implementations. The color determination module 320 may be configured to determine the color palette data 338 at additional points in time. In some implementations, the color palette data 338 may be updated upon a change in the pixels of the color sample area 902, at a predetermined time, or on occurrence of another condition or trigger. For example, the color determination module 320 may process the image data 332 every second to determine one or more of the representative colors at that time and update the color palette data 338 accordingly.

Over time, as items 104 are added or removed to the inventory location 114, as other objects 1002 impinge into the color sample area 902 of the imaging sensor 120(1), and so forth, the representative color of the inventory location 114 may change. For example as shown here, items 104 have been removed from the shelf 504(1), leaving an empty or negative space in the color sample area 902(1). As a result, a second representative color 1004(1) is determined by the color determination module 320 which is different from the first representative color 904(1). Thus, at a first instant in time, the inventory location 114 of the shelf 504(1) manifested the first representative color 904(1) and a second instant in time the same shelf 504(1) manifested the second representative color 1004(1).

Likewise, the representative color may vary based on the other object 1002 entering into the color sample area 902. For example, the user 116 may extend a hand or arm toward the shelf 504. As the other object 1002 enters the color sample area 902, the representative color will change. For example, the shelf 504(3) may have a first representative color 904(3) of white. Continuing the example, the user 116 may be wearing a bright blue long sleeve shirt who reaches for an item 104 on the shelf 504(3). As the blue of the long sleeve shirt enters the color sample area 902(3), the representative color as determined may transition from white 904(3) to light blue 1004(3).

As described above, the color palette data 338, which includes information about the representative color, may be used to generate one or more of the visual elements in the user interface 128. By using one or more the representative colors described in the color palette data 338, the user 116 is provided a cue as to which user interface 128 or portion thereof is associated with a particular portion of the inventory location 114 or the items 104 therein. By updating the color palette data 338, and correspondingly updating the colors presented in the user interface 128, the user 116 may be presented with feedback. Thus, as the user reaches for the particular inventory location 114, they may experience the user interface 128 changing color to match their coloring.

Figure 11:
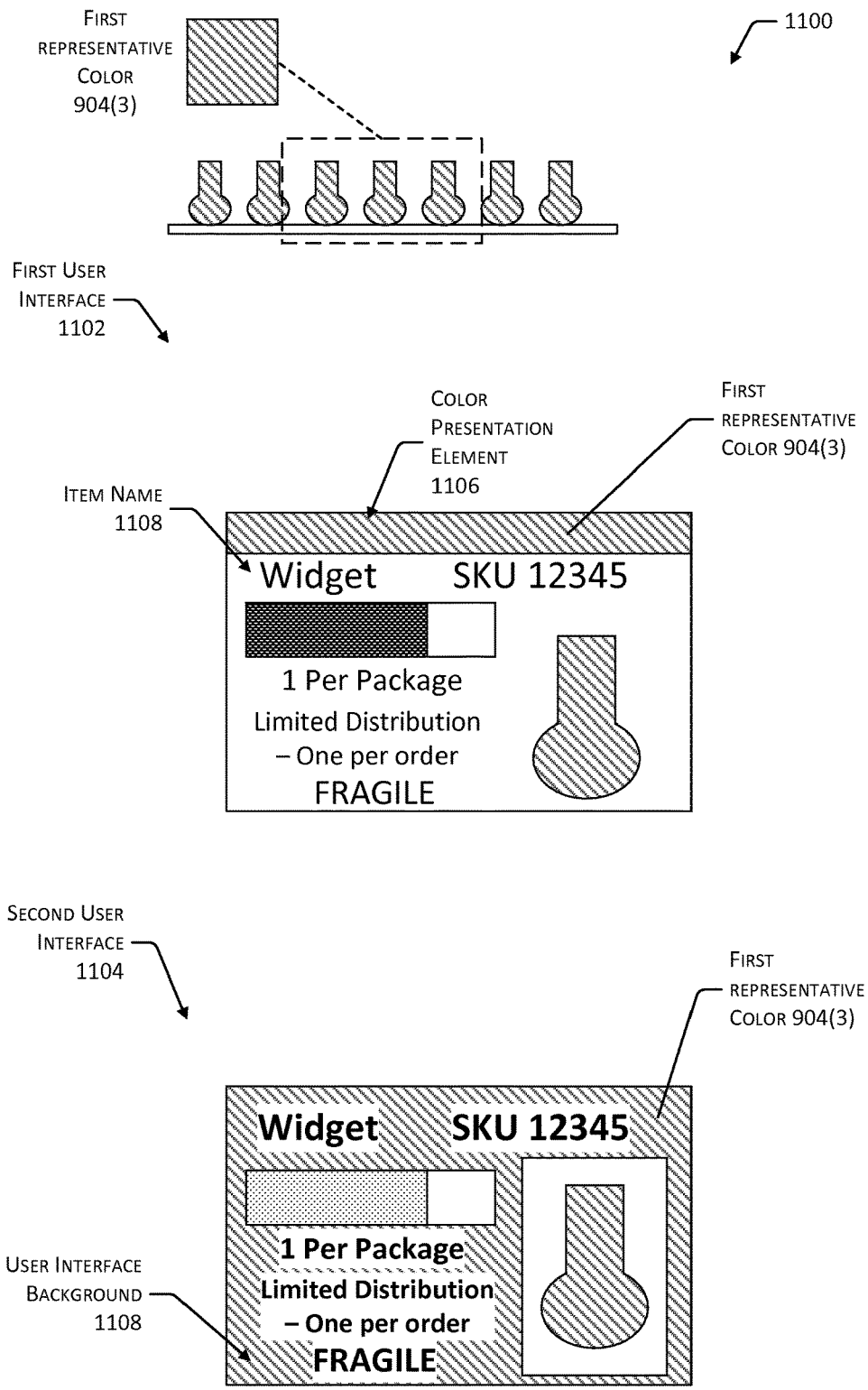
FIG. 11 illustrates example user interfaces using the first representative colors, according to some implementations.

FIG. 11 illustrates examples 1100 of user interfaces 128 using the first representative colors 904, according to some implementations. Depicted are a first user interface 1102 and a second user interface 1104, both presenting information for the same item 104.

The first user interface 1102 includes a color presentation element 1106. The color presentation element 1106 may be based at least in part on one or more of the colors in the color palette data 338. In this illustration, the color presentation element 1106 uses the representative color 904(3) as determined by the color determination module 320 to set the color for the color presentation element 1106. The color presentation element 1106 depicted here is a bar extending across an upper portion of the user interface 128. In other implementations, other shapes or portions of the user interface 128 may be so colored. For example, the color presentation element 1106 may comprise a border extending around at least a portion of the user interface 128.

The second user interface 1104 includes the user interface 128 having a user interface background 1108 set to the representative color 904(3). Other elements of the user interface may be configured with one or more complementary colors to improve visibility. Complementary colors may be determined using a color wheel, lookup table, or similar mechanism. Colors may be deemed complementary when their juxtaposition provides a strong contrast. Stated another way, complementary colors may be colors which when combined produce white or black. For example, the color complement of yellow may be blue, and vice versa. As another example, if the first representative color 904(3) is white the complementary color is black. Thus, the background having the representative color 904(3) of white may have black text or graphical elements presented thereon.

Figure 12:
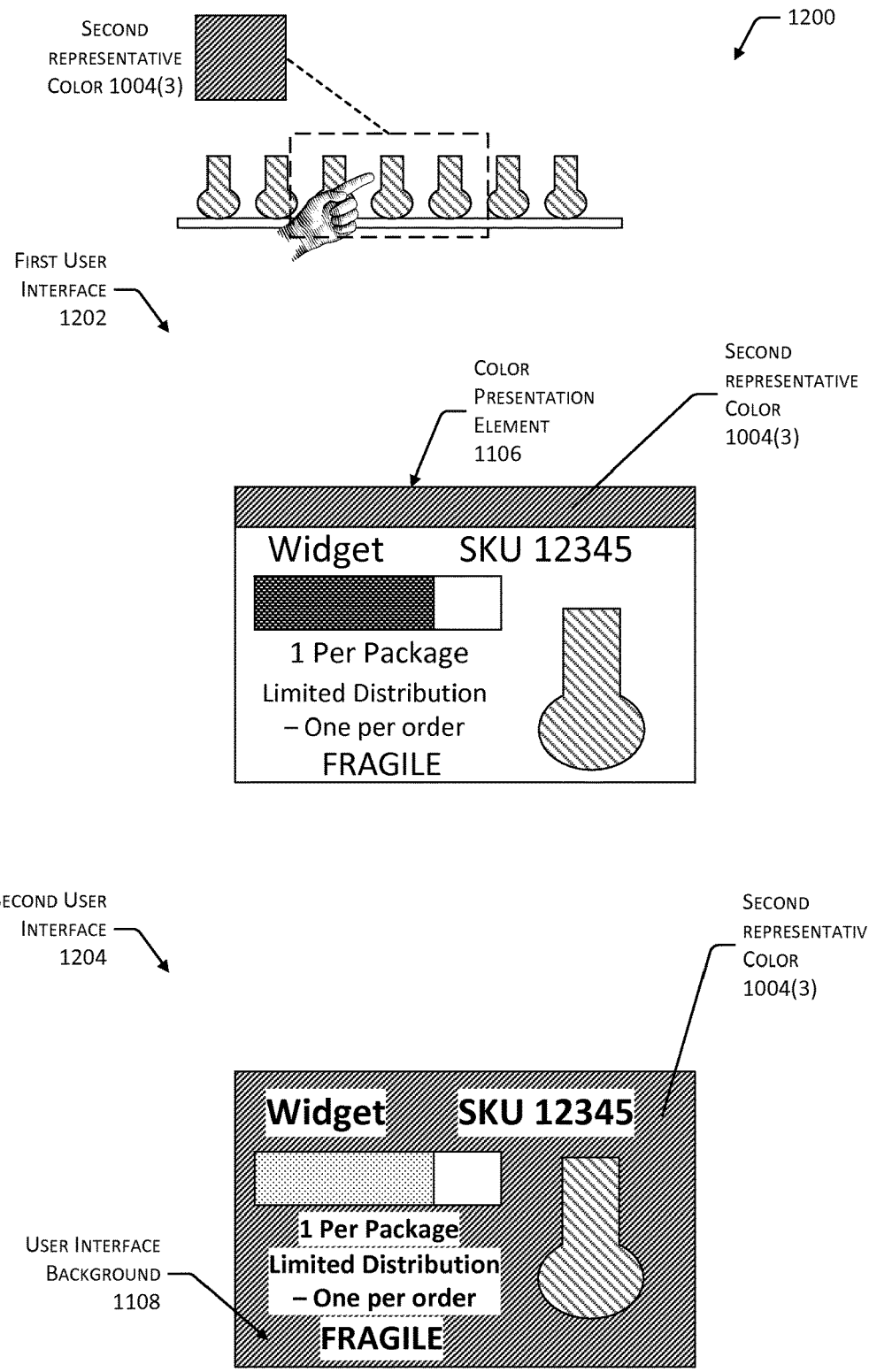
FIG. 12 illustrates the example user interfaces of FIG. 11 using the second representative colors, according to some implementations.

FIG. 12 illustrates examples 1200 of the user interfaces of FIG. 11 using the second representative colors, according to some implementations. As described above with regard to FIG. 10, as the other object 1002 enters the color sample area 902(3), the first representative color 904(3) may change to the second representative color 1004(3) of light blue. The color determination module 320 may determine this change and update the color palette data 338 accordingly. The user interface module 322 in turn may use the updated color palette data 338 to modify the user interface 128 as presented.

Depicted are a first user interface 1202 and a second user interface 1204, both presenting information for the same item 104, where the user interfaces 128 are based on the updated color palette data 338.

The first user interface 1202 has a color presentation element 1106 using the second representative color 1004(3). Similarly, the second user interface 1204 has a user interface background 1108 set to the second representative color 1004(3). As described above, other elements of the user interface 128 may use complementary colors relative to the representative color. For example, the color complement of yellow may be blue, and vice versa. Continuing the example, if the second representative color 1004(3) is light blue, the complementary color may be orange. Thus, the background having the representative color 1004(3) of light blue may have orange text or graphical elements presented thereon.

Illustrative Processes

Figure 13:
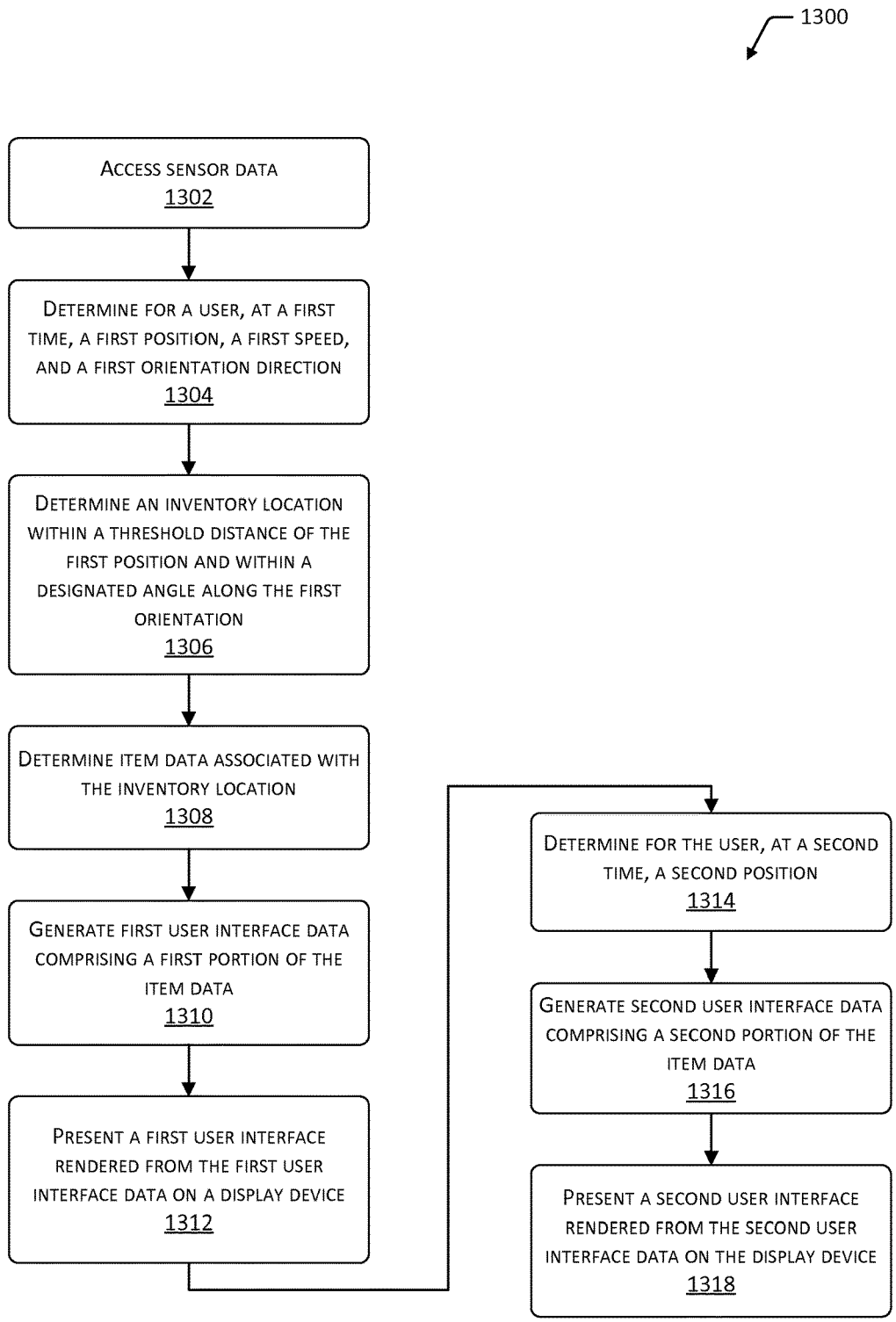
FIG. 13 depicts a flow diagram of a process for presenting a user interface based on kinematic data, according to some implementations.

FIG. 13 depicts a flow diagram 1300 of a process for presenting a user interface 128 based on the kinematic data 334, according to some implementations. The process may be performed at least in part by the inventory management module 316.

Block 1302 accesses the sensor data 330. For example, the sensor data 330 resulting from the one or more sensors 120 in the facility 102 may be retrieved from the memory 310.

Block 1304 determines, at a first time, kinematic data 334 using the sensor data 330. The kinematic data 334 may include a first position 334(1) of the user 116 within the facility 102, a first speed 334(3) of the user 116 within the facility 102, and a first orientation direction 334(2) of the user 116 relative to the facility 102. As described above, in other implementations, other kinematic data 334 combinations thereof may be determined.

Block 1306 determines an inventory location 114 is within a threshold distance 610 of the first position 334(1)(1) of the user 116 and within a designated angle 608 along the first orientation direction 334(2)(1). For example, the first position 334(1)(1) and the first orientation direction 334(2)(1) may be compared using information specified in the kinematic threshold data 336. Distance 334(4) may be calculated between the first position 334(1)(1) and one or more inventory locations 114. The distance 334(4) may be specified by the kinematic threshold data 336, and in this illustration may be within the threshold distance 610. Similarly, the field of view of the user 116 along the first orientation direction 334(2)(1) and considering the designated angle 608 may include the inventory location 114. The orientation direction 334(2) may be indicative of the body direction 602, the gaze direction 604 of an eye of the user 116, the tote direction 606, and so forth.

Block 1308 determines the item data 340 associated with the inventory location 114. An inventory location 114 may be associated with a particular item 104. For example, the inventory location 114(1) may be designated as holding the item 104 with an item name of "widget" and a SKU of 12345. The item 104 may be currently located at the inventory location 114 (such as sitting on the shelf) or may be designated for placement at that inventory location 114 (such as when the stock of the item 104 runs out). In one implementation, the determination of the item data 340 may comprise accessing a data structure which associates the inventory location 114 with the item data 340.

Block 1310 generates first user interface data 124(1) comprising a first portion of the item data 340. The first portion of the item data 340 may be retrieved, responsive to the distance 334(4)(1) between the first position of the user 116 and the inventory location 114. For example, the quantity or extent of the first portion may be proportionate to the distance. In other implementations, the distance 334(4) may be relative to a display device 126, or other point in the facility 102. The first portion of the item data 340 may also be responsive to the first speed 334(3)(1) of the user 116.

Block 1312 presents a first user interface 128(1) rendered from the first user interface data 124(1) on the display device 126. For example, the first user interface 128(1) may comprise that depicted above with respect to 702(2). As described above, in some implementations, the display device 126 may comprise a transparent OLED display 126(2).

A transition time of the display device 126 to present the first user interface 128(1) may be based on, or proportionate to, the first speed 334(3)(1). For example, a speed above 3 m/s may result in a transition from a blank display device 126 to the presentation of the first user interface 128(1) in 100 ms, while speeds below 3 m/s may result in the transition taking place in 300 ms. The transition may also be based on other kinematic data 334. The transition may use one or more visual effects including fades, wipes, color inversion, apparent motion, one or more moving elements, and so forth.

Using the sensor data 330 generated at a second time, block 1314 determines, at the second time later than the first time, a second position 334(1)(2) of the user 116 within the facility 102. The second position 334(1)(2) may be closer to the inventory location 114, or other designated point. For example, the user 116 may be approaching the inventory location 114. In some implementations, other kinematic data 334 may be determined at the second time. For example, a second speed 334(3)(2) of the user 116 may be determined.

Block 1316 generates a second user interface data 124(2) comprising a second portion of the item data 340. The second portion of the item data 340 may be responsive to the distance 334(4)(2) between the second position 334(1)(2) and the inventory location 114. For example, as depicted above with regard to FIG. 7, the second portion of the item data 340 may include additional information. In other implementations, other kinematic data 334 may be used to generate the second user interface data 124(2). For example, the second portion of the item data 340 may be responsive to the second speed 334(3)(2) of the user 116. Also, in some implementations, the second portion of the item data 340 may be cumulative, such that the second portion contains the first portion.

Block 1318 presents a second user interface 128(2) rendered from second user interface data 124(2) on the display device 126. For example, the second user interface 128(2) may comprise that depicted above with respect to user interface 702(3).

The first user interface data 124(1), the second user interface data 124(2), or both may be configured to provide user interfaces 128 in which one or more elements are presented at a size on the display device 126 which is proportionate to one or more of the kinematic data 334. For example, the size of the text, graphics, and so forth, may increase as speed 334(3) increases or decrease as speed 334(3) decreases. The proportionality may be based on one or more of the first speed 334(3)(1), the distance 334(4) between the first position 334(1)(1) and the inventory location 114, the second speed 334(3), the distance 334(1)(2) between the second position 334(1)(2) and the inventory location 114, and so forth. The proportionality may be based on absolute value of the kinematic data 334 used.

Figure 14:
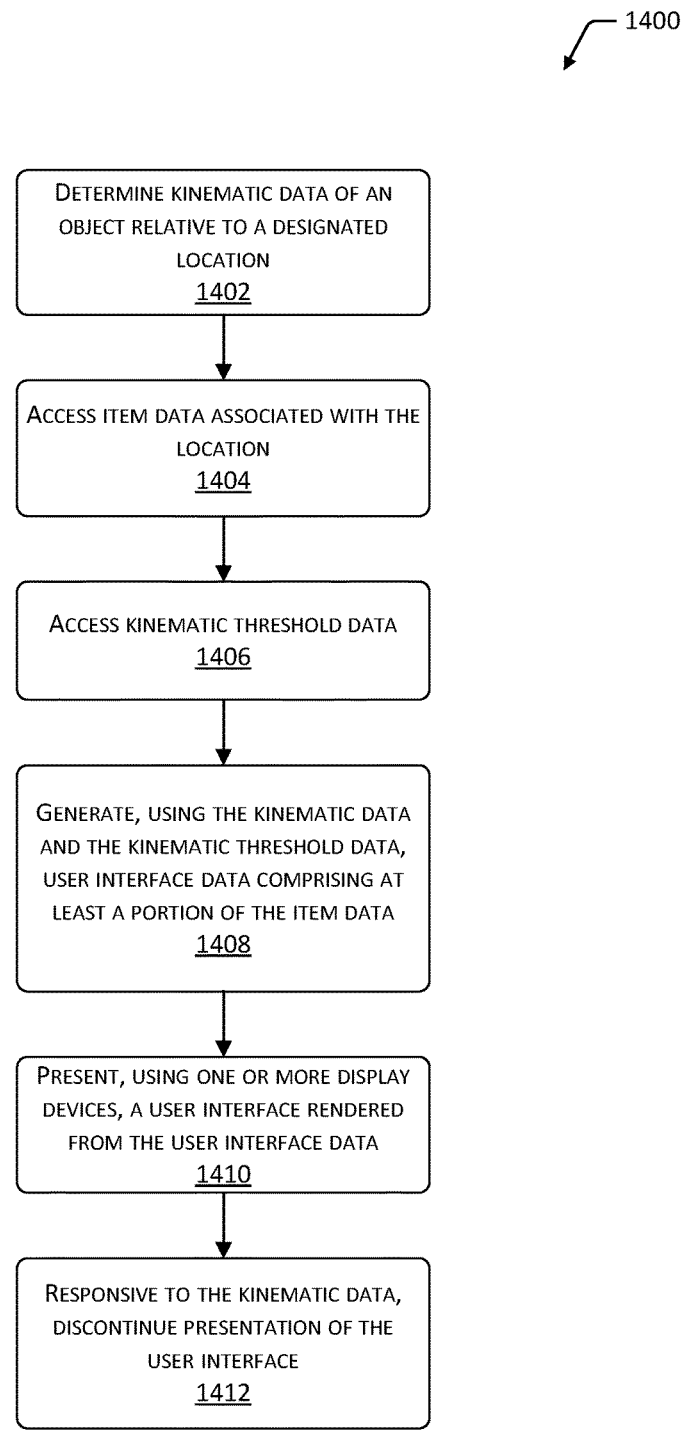
FIG. 14 depicts a flow diagram of another process for presenting a user interface based on kinematic data, according to some implementations.

FIG. 14 depicts a flow diagram 1400 of another process for presenting a user interface 128 based on the kinematic data 334, according to some implementations. The process may be performed at least in part by the inventory management module 316.

Block 1402 determines kinematic data 334 of an object relative to a designated location in the facility 102. The designated location may be a particular point, a group of points, an area, a volume, a particular inventory location 114, and so forth. The objects may include the items 104, the users 116, the totes 118, and so forth. For example, a speed 334(3) may be relative between the tote 118 and a particular location within the facility 102, such as a point on the floor. The determination may be based on sensor data 330 acquired by the one or more sensors 120. For example, one or more sensors 120 may be onboard the tote 118, and the kinematic data 334 may be based at least in part on the sensor data 330 associated with those sensors 120. In another example, a relative position of an object in an image or a change in position of the object between images may be used to determine the particular location, speed, and so forth.

As described above, the kinematic data 334 may include one or more of: a position 334(1) of the object, a direction 334(2) of at least a portion of the object, a speed 334(3) of the object, a distance 334(4) between the object and the designated location, acceleration of the object, or other 334(K). For example, the direction 334(2) may comprise an orientation direction such as a body direction 602, gaze direction 604, the tote direction 606, and so forth.

Block 1404 accesses item data 340 associated with the designated location. For example, item data 340 may be associated with an inventory location 114, display device 126, user 116, tote 118, point, area, or volume within the facility 102, and so forth. Continuing the example, the item data 340 about the item 104 having the item name "widget" and the SKU "12345" may be associated with a particular inventory location 114.

Block 1406 accesses kinematic threshold data 336. As described above, the kinematic threshold data 336 may include one or more thresholds, conditions or other parameters which may be used to control presentation of the user interface 128, the information presented thereby, and so forth. The kinematic threshold data 336 may include but is not limited to, an area designated within the facility 102, a threshold distance 610 value from the designated location, a minimum speed of the object, a maximum speed of the object, an acceleration threshold value, a designated direction of motion, a designated angle 608, or a designated heading. For example, the designated angle 608 may indicate an angle relative to the user's body direction 602 within which the user 116 may be able to see output on one or more of the visual displays 126. In comparison, the designated heading may specify a compass direction such as northeast.

In some implementations, the kinematic threshold data 336 may be associated with a particular user 116. For example, the user 116(1) named "Albert" may have different threshold distances 610, threshold speeds, and so forth, than the user 116(2) "Bertram". The inventory management system 122 may be configured to determine user identity of the user 116. The determination may include using one or more techniques including, but not limited to: reading a value stored within RF tag 206 carried by the user 116, facial recognition based on image data 332, analysis of the user's 116 gait, receiving manual entry of login credentials, voice recognition, analysis of biometric features, and so forth. For example, the imaging sensors 120(1) of the environment may be configured to acquire an image of the user's 116 face. One or more characteristics of the face in the image may be determined, and compared with previously stored data to determine the identity. In another example, an image of the user's 116 iris may be acquired and compared with previously stored iris patterns to determine identity. Once identified, the particular kinematic threshold data 336 may be accessed and used to generate the user interface 128.

Block 1408 uses the kinematic data 334 and the kinematic threshold data 336 to generate the user interface data 124 configured to present a portion of the item data 340. For example, the user interface data 124 may be responsive to the orientation direction 334(2) of the object corresponding to the designated heading. Continuing the example, the orientation direction 334(2) of the object may indicate the user 116 is facing northeast, and the designated heading may specify presentation of particular information in the user interface 128 when the user 116 is oriented in this direction 334(2).

As described above, in some implementations, the portion of the item data 340 presented may be responsive to the determined user identity of the user 116. For example, the user 116(1) "Albert" may be presented with picking limitations such as one per order, while the user 116(2) "Bertram" may be presented with a picking limitation allowing up to three per order. Based at least in part on the determined user identity of the user 116, the selected portion of the item data 340 may be included in the user interface data 124 presented in the user interface 128.

Block 1410 presents, using one or more display devices 126, a user interface 128 rendered from the user interface data 124. As described above, in some implementations, a transition effect may be applied to the presentation of the user interface 128. For example, the user interface 128 may fade in from a blank screen to the user interface 128 over a period of time.

In some implementations, the portion of the item data 340 included in the user interface data 124 may be proportionate to the kinematic data 334. For example, a first speed 334(3)(1) of the object less than the minimum speed may present a first set of item data 340(1) and a second speed 334(3)(2) of the object greater than or equal to the minimum speed may present a second set of item data 340(2).

The user interface 128 may be configured to transition from a first state to a second state on the one or more display devices 126. For example, the first state may comprise the presentation of no information or information other than the item data 340. Continuing the example, no information, such as depicted by user interface 702(1) may result from the display device 126 being in a low power off state. Information other than the item data 340 may include advertisements, promotional information, directional instructions such as indicating presence of exits, and so forth. In comparison, the second state comprises the presentation of the portion of the item data 340, such as shown by the user interface 702(2).

The transition may be presented as one or more visual effects. The visual effects may include one or more of: a fade from the first state to the second state, changing one or more colors, changing scaling of one or more visual elements in the user interface, or a visual motion effect. For example, changing scaling of one or more visual elements may make those visual elements appear to grow larger or smaller on the display device 126. Other transitions may include insertion of images or texts between the first state and the second state. For example, a picture of a mountain may be presented as the transition.

In some implementations, the transition for use in the user interface 128 may be selected from a plurality of available transitions using, at least in part, a random or pseudorandom value. For example, twenty different transitions may be available for presentation. A pseudorandom number generator may be used to select one of those twenty transitions for use at a particular point in time. In another implementation, the transitions may be selected sequentially or every nth transition. For example, every third transition on the list may be selected and used at a particular time.

The selection of transitions may be responsive, at least in part, on time of day, weather conditions, sensor data 120, day of the week, and so forth. For example, the first transition may be used on Mondays while a second transition may be used on Fridays.

Responsive to the kinematic data 334, block 1412 discontinues presentation of the user interface 128. For example, the kinematic determination module 318 may determine the position 334(1) of the user 116 is beyond the threshold distance 610. Following this determination, the user interface module 322 may discontinue presentation of the user interface 128 by the display device 126.

Figure 15:
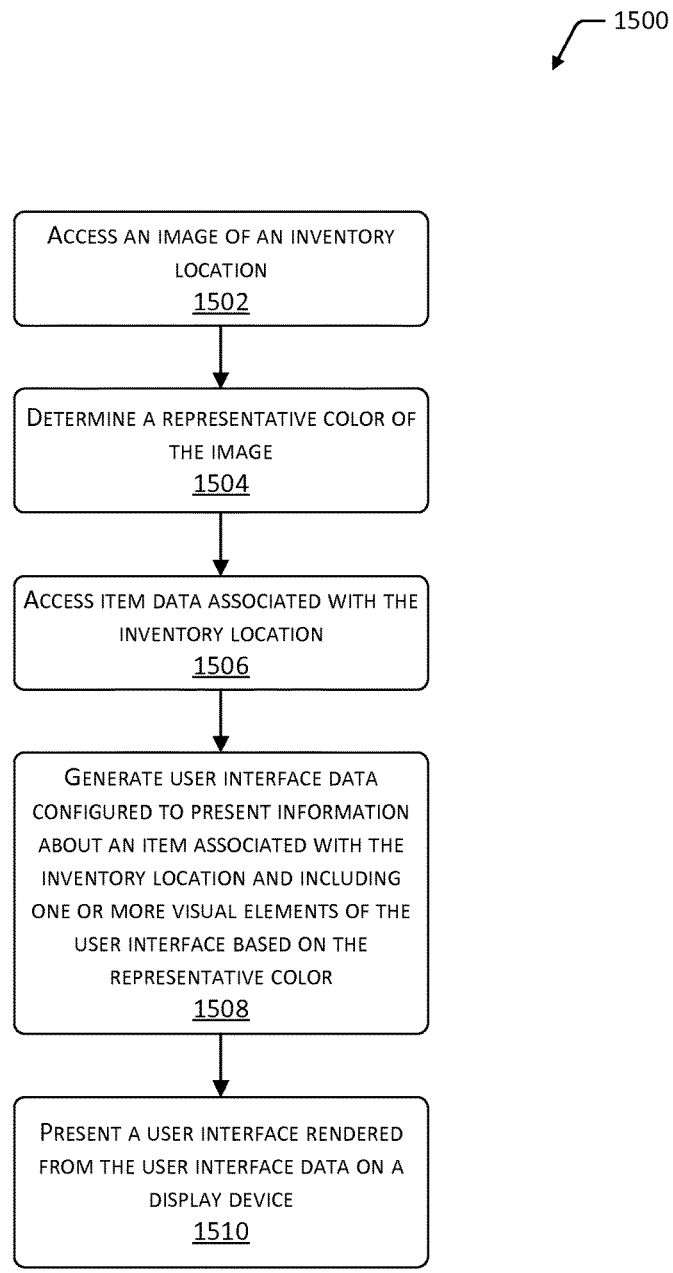
FIG. 15 depicts a flow diagram of a process for presenting a user interface using the representative color of the inventory location, according to some implementations.

FIG. 15 depicts a flow diagram 1500 of a process for presenting a user interface 128 using the representative color or other color palette data 338 of the inventory location 114, according to some implementations. The process may be performed at least in part by the inventory management module 316.

Block 1502 accesses one or more images of one or more inventory locations 114. For example, image data 332 may be acquired by one or more imaging sensors such as cameras.

Block 1504 determines one or more representative colors of the image. In one example, the color determination module 320 may generate color palette data 338 including a range of colors having a greatest overall brightness in the image above a threshold value.

The color palette data 338 may comprise one or more colors within a predetermined distance of the representative color within a color space. The color space numerically describes a plurality of colors as expressed using two or more dimensions. For example, colors may be deemed close when within ten units in that color space of one another, thus the colors hex #780000 (RGB (120, 0, 0)) and hex #800000 (RGB (128, 0, 0)) may be considered close and may be used interchangeably.

In another example, the determination may comprise generating a plurality of bins, wherein each bin spans a range of color values, such as a hue. The bins comprise a data storage location in a data structure, memory location, or other construct suitable for storing information. A hue value may be read from every $n^{th}$ pixel of the image, where n is an integer value of 1 or greater. Each hue value may be placed into, or otherwise associated with, a corresponding bin. A count of the hue color values in each of the bins is performed. For example, the counts may be visualized as a histogram. The bin having a greatest count may be designated as the representative color. A top k set of colors or range of colors as sorted by frequency of occurrence may be designated as representative colors as well.

In still another example, the representative color may be determined by calculating a range of color values in the image having a greatest frequency of occurrence within pixels of the image. The color value may comprise hue, saturation, brightness, red value, green value, blue value, alpha value indicative of opacity of a pixel, or other metric or indicia associated with pixels of an image.

Block 1506 accesses the item data 340. The item data 340 may be associated with a particular inventory location 114 as included in the image. For example, the image may be of the color sample area 902(3) including a portion of the shelf 504(3) and the items 104 thereon. The item data 340 for the items 104 on the shelf may be accessed from the memory 310. The display device 126 may include one or more of the display devices 126 described above, such as a transparent OLED display 126(2), an electrophoretic display 126(3), and so forth. As described above, the display devices 126 may be arranged on, or are proximate to, the inventory location 114. For example, one or more of the display devices 126 may be arranged along an edge of the shelf 504.

In one implementation, the image data 332 of the inventory location 114 may be generated without the use of one or more of the sensors 120 in the facility 102. For example, the image of the inventory location 114 may be simulated or generated based on previously acquired image data 332 of the items 104 designated for storage at the inventory location 114 which may be associated with the item data 340. The item data 340 may also include an inventory level indicative of the quantity of the items 104 present at the inventory location 114.

Continuing this implementation, the determination of the representative color may include use of the image data 332 retrieved from the item data 340, such as a catalog image of the item 104, and the current inventory level or quantity on the shelf. Thus, the color determination module 320 may be configured to use image data 332 acquired from an imaging sensor 120(1) such as a camera, or which is generated without the use of a camera in the facility 102.

In one example, the determination may include calculating, for a range of hues in the image, a greatest frequency of occurrence within at least a portion of pixels of the image. One or more brightness values may be adjusted based at least in part on the inventory level. Continuing the example, the item 104 having trademarked red color may be determined to have the representative color as that red, but the relative brightness of that representative color may be varied based on how much stock is present on the shelf 504. As a result, a fully stocked shelf 504 for the item 104 with the trademark red color may be presented in the user interface 128 is a very bright red, while an empty stocked shelf 504 may be presented as a very dim red color. As a result, the user interface 128 and the presentation of the visual element may provide a visual cue as to the quantity of the items 104 in the inventory location 114. This technique may be applied when using image data 332 acquired from an imaging sensor 120(1), or based on a simulated or previously stored image.

Block 1508 generates user interface data 124 configured to provide, when rendered, a user interface 128 which includes a portion of the item data 340 and one or more visual elements based on the representative color. The one or more visual elements may use the representative color, or another color which is derived from or otherwise associated with the representative color. For example, the one or more visual elements may use a color which the display device 126 is able to reproduce, which is closest in a color space to the representative color. The visual element using the representative color may include one or more of: a border around one or more sides of the portion of the item data 340 as presented on the display device 126, a color presentation element 1106, a user interface background 1108 to the portion of the item data 340 as presented on the display device 126, and so forth.

In some implementations, the visual elements may use a complementary color relative to the representative color. Complementary colors may be determined using a color wheel, lookup table, or similar mechanism. In one implementation using the HSB (hue, saturation, brightness) color selection model, a complementary color may be determined by taking the representative color's hue value and adding or subtracting 180 degrees. For example, using this technique a complementary color of red (H=0) is cyan (H=180). In another implementation, the complementary color may take the representative color's hue value and adding or subtracting 180 degrees and also inverting the saturation and brightness values.

The user interface data 124 may be configured to present a portion of the item data 340 as text having a color complementary to the representative color while the one or more visual elements comprise a background within which the text appears. For example, the item name and the item SKU may be presented in a font using an aqua color while the background 118 comprises the representative color of red.

Some items 104 may have particular colors associated with them. For example, the item 104 may use a particular type of trade dress such as red packaging to present brand identity. In some implementations, the item data 340 may include one or more predefined colors or a color palette. These one or more predefined colors may be incorporated into the color palette data 338. In some implementations, the predefined colors may override the representative color determined by the color determination module 320, and thus may be used to generate the user interface data 124. The predefined color may be used to color at least a portion of one or more visual elements. For example, the border of the user interface may be presented in the representative color while the background of the user interface may use the predefined color.

In some implementations, particular users 116 may have color preferences. For example, the user 116 who is red green colorblind may prefer to have the user interface 128 present other color combinations to improve intelligibility. The inventory management system 122 may be configured to determine the user identity of the user 116 of the facility 102 as described above. One or more user color preferences associated with the user identity may be retrieved from the memory 310. The color palette data 338 may be based at least in part on the user color preferences. Continuing the example, instead of the representative color of red for the items 104 of the inventory location 114, the colorblind user 116 may be presented with another color they are more easily able to perceive.

The user interface data 124 may be dynamically adjusted as described based at least in part on the kinematic data 334. Also, the user interface data 124 may include one or more of the transitions between user interface states.

Block 1510 presents a user interface 128 rendered from the user interface data 124 on the display device 126. In some implementations, the process may be ongoing.

This implementation may include acquiring a second image, wherein the second image is acquired at a time after acquisition of the first image. The second image may be accessed and a second color palette comprising one or more representative colors of the second image may be determined. The one or more visual elements of the visual user interface 128 may be modified to use one or more colors of the second color palette, or replace one or more colors of the second color palette. For example, the user interface background 1108 may transition from the first representative color 904 to the second representative color 1004.

For example, at a predetermined time or upon the occurrence of a predetermined event, a new image of the inventory location 114 may be acquired and accessed, and the corresponding representative color may be changed with a subsequent change to the user interface 128 as presented by the display device 126.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of presenting information in a materials handling facility, the method comprising:
    presenting a user interface;
    determining a representative color of an inventory location based on one or more color characteristics of the inventory location, wherein the determining is performed by:
        accessing an image of at least a portion of the inventory location, and
        determining a frequency of occurrence of a color value within pixels of the image, wherein the color value comprises a hue, saturation, or brightness;
    accessing item data of an item associated with the inventory location;
    generating user interface data based on the representative color of the inventory location, the user interface data including:
        at least a portion of the item data, and
        one or more visual elements that use a color palette derived from the representative color; and
    presenting an update to the user interface based on the user interface data.

2. The method of claim 1, wherein the color palette comprises one or more colors within a predetermined distance of the representative color within a color space, wherein the color space numerically describes a plurality of colors as expressed using two or more dimensions.

3. The method of claim 1, wherein at least a portion of the one or more visual elements use a complementary color relative to the representative color.

4. The method of claim 1, wherein the item data comprises a predefined color, and further wherein the color palette includes the predefined color for use with at least a portion of the one or more visual elements in conjunction with the representative color.

5. The method of claim 1, wherein the one or more visual elements comprise at least one of:
    a border around one or more sides of the at least a portion of the item data as presented by the user interface;
    a background of the user interface;
    text presenting the at least a portion of the item data in the user interface; or
    a graphic presenting the at least a portion of the item data in the user interface.

6. The method of claim 1, further comprising:
    acquiring, with a camera, the image of the least a portion of the inventory location; and
    wherein the determining the representative color further comprises:
        designating a plurality of color value ranges, wherein:
            each of the plurality of color value ranges extends from a first color value to a second color value; and
        determining a count of color values in the image which are within the plurality of color value ranges.

7. The method of claim 1, further comprising:
    acquiring, with a camera, the image of the least a portion of the inventory location.

8. The method of claim 1, wherein the item data comprises:
    an image of the item designated for storage at the inventory location;
    an inventory level indicative of a quantity of items present at the inventory location; and
    wherein the determining the representative color further comprises:
        calculating, for a range of hues in the image of the at least a portion of the inventory location, a greatest frequency of occurrence within at least a portion of pixels of the image of the at least a portion of the inventory location; and
    adjusting brightness based on the inventory level.

9. The method of claim 1, further comprising:
    determining a user identity of a user of the materials handling facility;
    accessing one or more user color preferences; and
    wherein the color palette is further derived using the one or more user color preferences such that the color palette includes preferred colors or color ranges.

10. The method of claim 1, wherein:
    the at least a portion of the item data is presented in the user interface as text having a color complementary to the representative color; and
    the one or more visual elements comprise a background within which the text appears.

11. A system for presenting information to a user in a materials handling facility, the system comprising:
    a display device associated with an inventory location in the materials handling facility;
    a memory, storing:
        item data comprising information about an item associated with the inventory location, and
        computer-executable instructions; and
    a hardware processor in communication with the display device and the memory, wherein the hardware processor is configured to execute the computer-executable instructions to:
        determine a representative color of at least a portion of the inventory location by:
            accessing an image of the at least a portion of the inventory location, and
            determining a frequency of occurrence of a color value within pixels of the image, wherein the color value comprises a hue, saturation, or brightness;
        generate user interface data based on the representative color, the user interface data comprising:
            a portion of the item data, and
            one or more visual elements using a color palette derived from the representative color; and present, on the display device, a user interface rendered from the user interface data with the one or more visual elements using the color palette derived from the representative color.

12. The system of claim 11, wherein:

the inventory location comprises a shelf;

the display device is arranged along an edge of the shelf; and the one or more visual elements using the color palette derived from the representative color comprise one or more of:

a border having the representative color around one or more sides of the user interface as presented on the display device, or a background of the user interface as presented on the display device having the representative color.

13. The system of claim 11, the computer-executable instructions to determine the representative color of the at least a portion of the inventory location further comprising instructions to:

generate a plurality of bins, wherein each bin spans a range of hue values and comprises a data storage location in a data structure;

read a hue value from every $n^{th}$ pixel of an image, where n is an integer value of 1 or greater;

store the read hue value from the every $n^{th}$ pixel in a corresponding bin;

for the each bin, generate a count of the hue values stored therein; and designate the bin having a greatest count as the representative color.

14. A system comprising:

a memory, storing:

computer-executable instructions; and a hardware processor in communication with the memory, wherein the hardware processor is configured to execute the computer-executable instructions to:

determine a representative color of at least a portion of a physical location by:

accessing an image of the at least a portion of the physical location, designating a plurality of color value ranges, wherein each of the plurality of color value ranges extends from a first color value to a second color value, and determining a count of color values in the image that are within the plurality of color value ranges;

generate user interface data based on the representative color, the user interface data comprising one or more visual elements, wherein the one or more visual elements use a color palette derived from the representative color; and present a user interface based on the user interface data.

15. The system of claim 14, further comprising:

a display device proximate to the at least a portion of the physical location, wherein the display device is configured to present the user interface in color.

16. The system of claim 14, the memory further storing information associated with the at least a portion of the physical location; and wherein the hardware processor is further configured to execute the computer-executable instructions to:

access the information associated with the at least a portion of the physical location; and wherein the generation of the user interface data comprises a portion of the information for presentation in the user interface as text.

17. The system of claim 16, wherein:

the at least a portion of the physical location comprises a structure configured to hold an item, and the information comprises item data with a product identifier of the item.

18. The system of claim 14, wherein the hardware processor is further configured to execute the computer-executable instructions to:

determine the color palette derived from the representative color; and configure the one or more visual elements to use one or more colors of the color palette.

19. The system of claim 14, further comprising one or more cameras, wherein the one or more cameras are configured to acquire the image of the at least a portion of the physical location, and wherein the one or more cameras are mounted on one or more of:

a ceiling mount;

a tote;

the at least a portion of the physical location; or at another physical location.

20. The system of claim 14, wherein:

the color values comprise one or more of:

hue, saturation, brightness, red value, green value, blue value, or alpha value indicative of opacity of a pixel; and wherein the computer-executable instructions to determine the representative color further comprise instructions to:

sort the plurality of color value ranges by their respective counts;

determine a top k set of color value ranges, wherein k is an integer greater than 1; and designate, as the color palette derived from the representative color, colors associated with each of the top k set of color value ranges.

* * * * *